US012331673B2

(12) United States Patent
Schmidt et al.

(10) Patent No.: US 12,331,673 B2
(45) Date of Patent: Jun. 17, 2025

(54) SYSTEMS AND METHODS FOR CONTROLLING EXHAUST GAS EMISSIONS OF A MULTIPLE SCR AFTERTREATMENT SYSTEM

(71) Applicant: CUMMINS INC., Columbus, IN (US)

(72) Inventors: David Schmidt, Indianapolis, IN (US); Jeffrey Diwakar Abraham, Columbus, IN (US); Thomas R. Nelson, Greenwood, IN (US); Xiaobo Song, Columbus, IN (US); Yuying Song, Columbus, IN (US); Ying Yuan, Rexford, NY (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/956,290

(22) Filed: Sep. 29, 2022

(65) Prior Publication Data

US 2023/0105573 A1 Apr. 6, 2023

Related U.S. Application Data

(60) Provisional application No. 63/251,156, filed on Oct. 1, 2021.

(51) Int. Cl.
*F01N 3/20* (2006.01)

(52) U.S. Cl.
CPC ........... *F01N 3/208* (2013.01); *F01N 3/2013* (2013.01); *F01N 2240/16* (2013.01);
(Continued)

(58) Field of Classification Search
CPC ...... F01N 3/208; F01N 3/2066; F01N 3/2013; F01N 3/103; F01N 3/106; F01N 5/02;
(Continued)

(56) References Cited

U.S. PATENT DOCUMENTS

| 6,125,629 A | 10/2000 | Patchett |
| 7,485,272 B2 | 2/2009 | Driscoll et al. |
| 8,302,379 B2 * | 11/2012 | Narayanaswamy ........... F02D 41/0235 60/285 |
| 8,473,177 B2 | 6/2013 | Madurai Kumar et al. |
| 8,997,461 B2 | 4/2015 | Henry et al. |
| 9,441,520 B2 | 9/2016 | Henry et al. |
| 9,567,888 B2 | 2/2017 | Gupta et al. |

(Continued)

FOREIGN PATENT DOCUMENTS

| EP | 3 192 991 | 7/2017 |
| EP | 3 365 006 A1 | 8/2018 |
| WO | WO-2019/101639 A1 | 5/2019 |

OTHER PUBLICATIONS

European Search Report on EP Appln 22198288.7 dated Mar. 7, 2023.
Examination Report for corresponding EP Patent Application No. 22198288.7, issued on May 6, 2024, 5 pages.

*Primary Examiner* — Dapinder Singh
(74) *Attorney, Agent, or Firm* — Foley & Lardner LLP

(57) ABSTRACT

Methods, apparatuses, and systems for managing a multiple, and particularly a dual-selective catalyst reduction (SCR), exhaust aftertreatment system according to one or more determined reductant dosing strategies are disclosed. A method includes: receiving, by a controller, data indicative of a catalyst of an aftertreatment system; determining, by the controller, a reductant dosing strategy based on a comparison of the data indicative of the catalyst to a respective threshold; and commanding, by the controller, an amount of reductant dosing based on the determined reductant dosing strategy.

15 Claims, 13 Drawing Sheets

(52) U.S. Cl.
CPC ...... *F01N 2570/14* (2013.01); *F01N 2610/02* (2013.01); *F01N 2610/146* (2013.01); *F01N 2900/1602* (2013.01)

(58) Field of Classification Search
CPC ...... F01N 13/009; F01N 13/0093; F01N 9/00; F01N 2560/021; F01N 2560/06; F01N 2560/14; F01N 2240/16; F01N 2570/14; F01N 2610/02; F01N 2610/146; F01N 2900/0414; F01N 2900/1602; F01N 2900/1626; Y02T 10/12; Y02T 10/40
See application file for complete search history.

(56) References Cited

U.S. PATENT DOCUMENTS

| | | |
|---|---|---|
| 9,903,247 B2 | 2/2018 | Koshy et al. |
| 11,608,766 B2* | 3/2023 | Swart ..................... F02D 41/08 |
| 2012/0036850 A1* | 2/2012 | Ernst ................... F01N 13/0097 60/287 |
| 2017/0037799 A1* | 2/2017 | Balenovic ............. F01N 3/2006 |
| 2017/0114690 A1* | 4/2017 | Gupta ................... F01N 3/0814 |
| 2017/0122159 A1 | 5/2017 | Bahrami |
| 2020/0063625 A1* | 2/2020 | Adelman ................ F01N 13/16 |

* cited by examiner

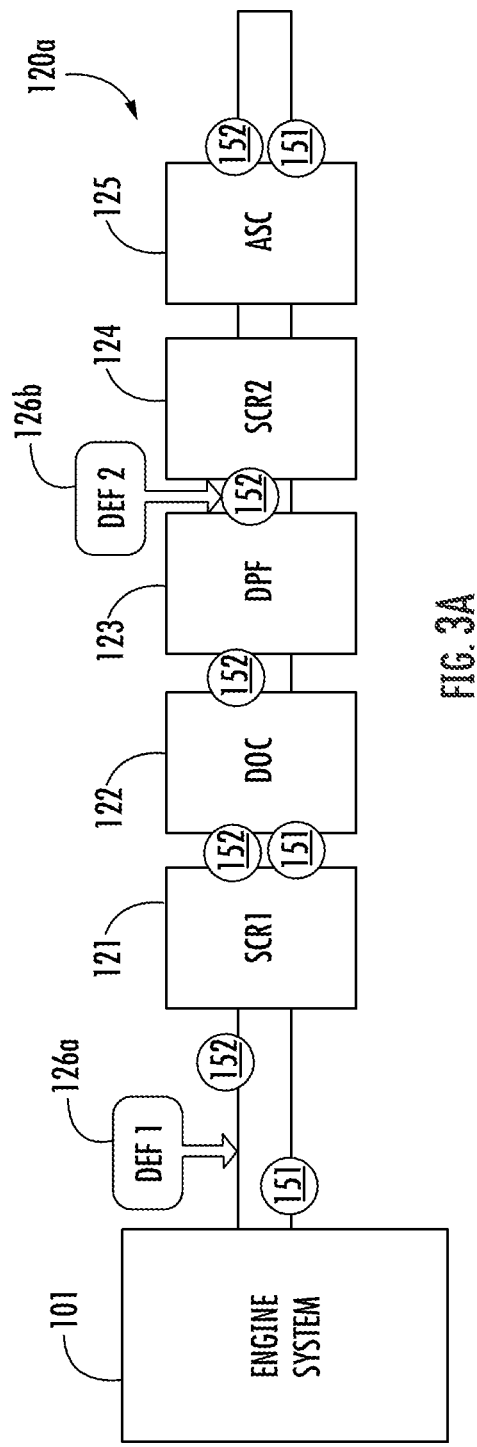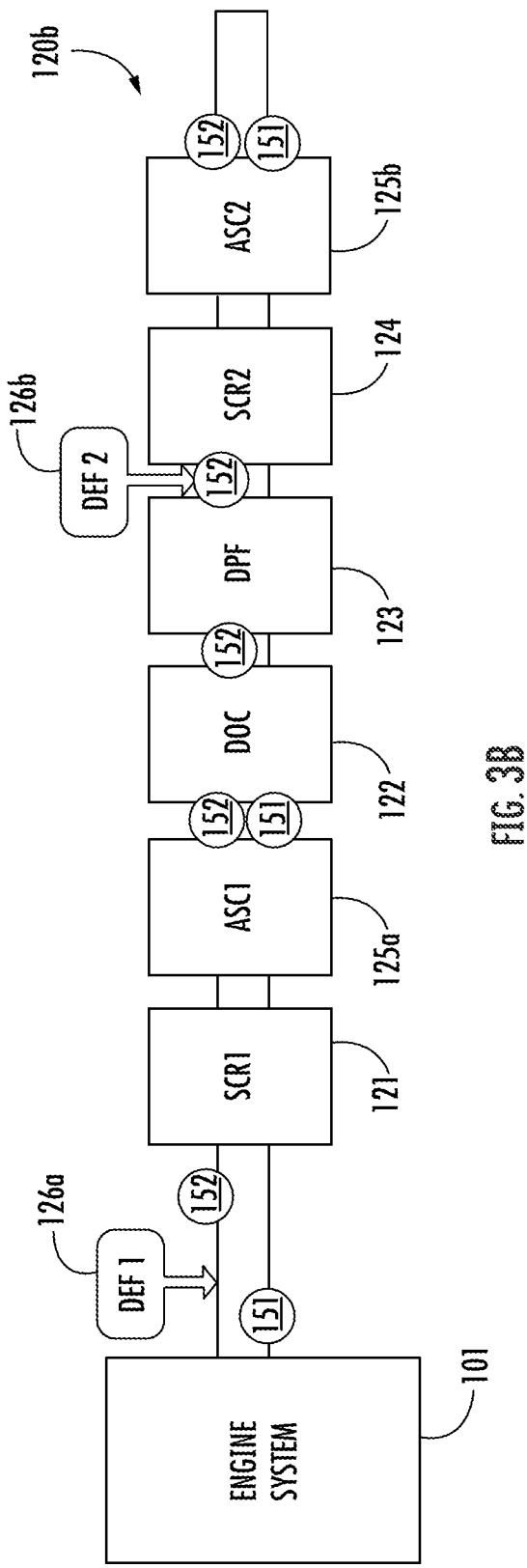

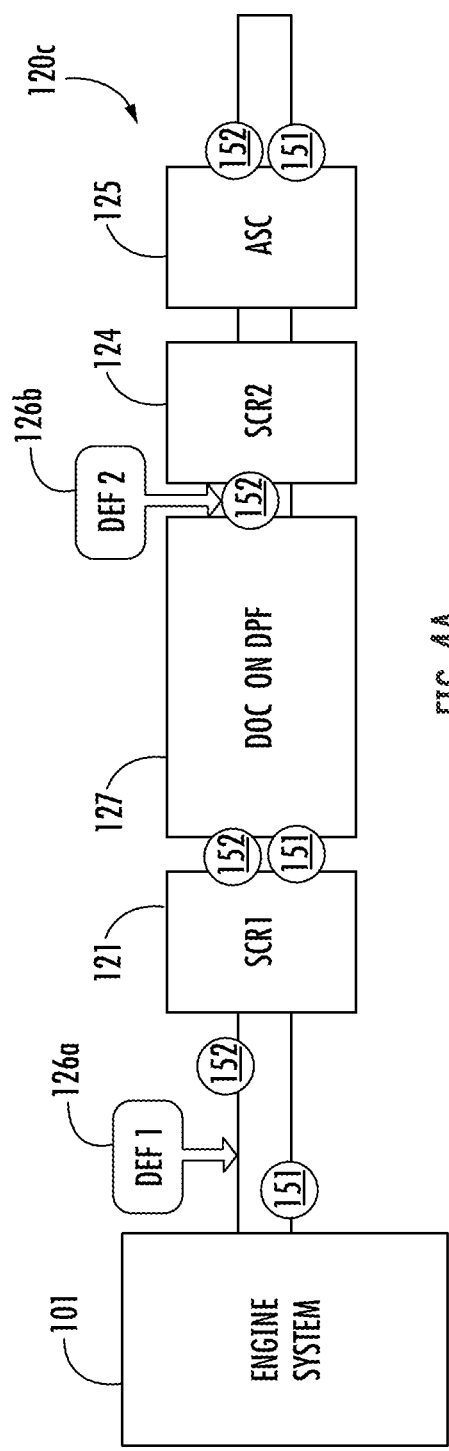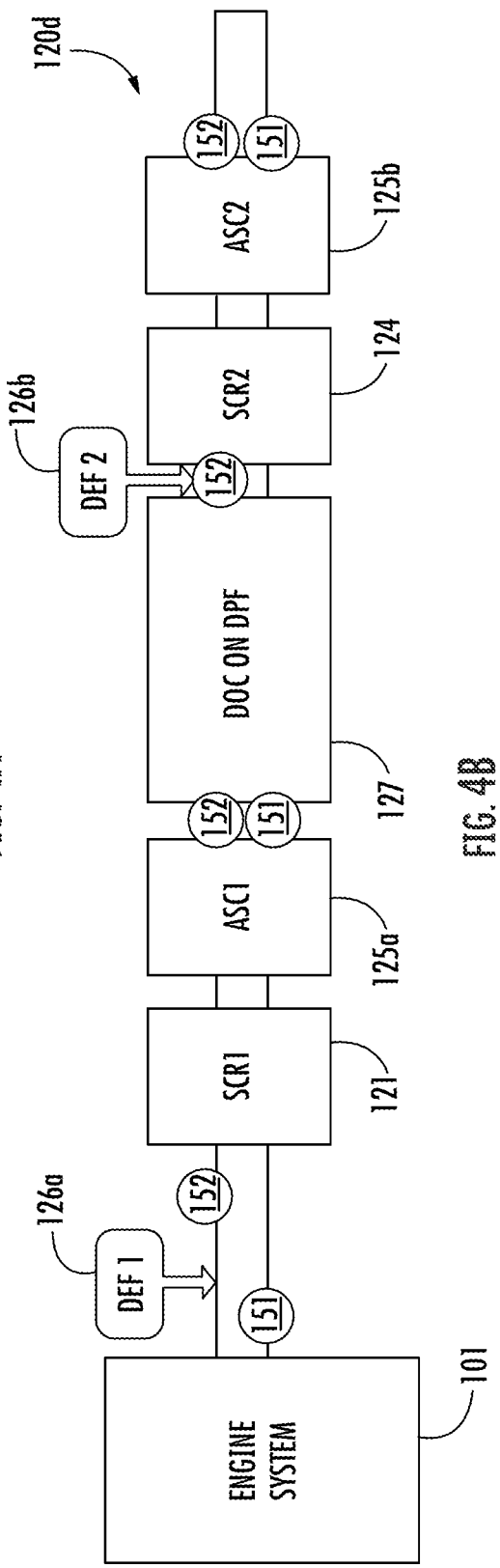

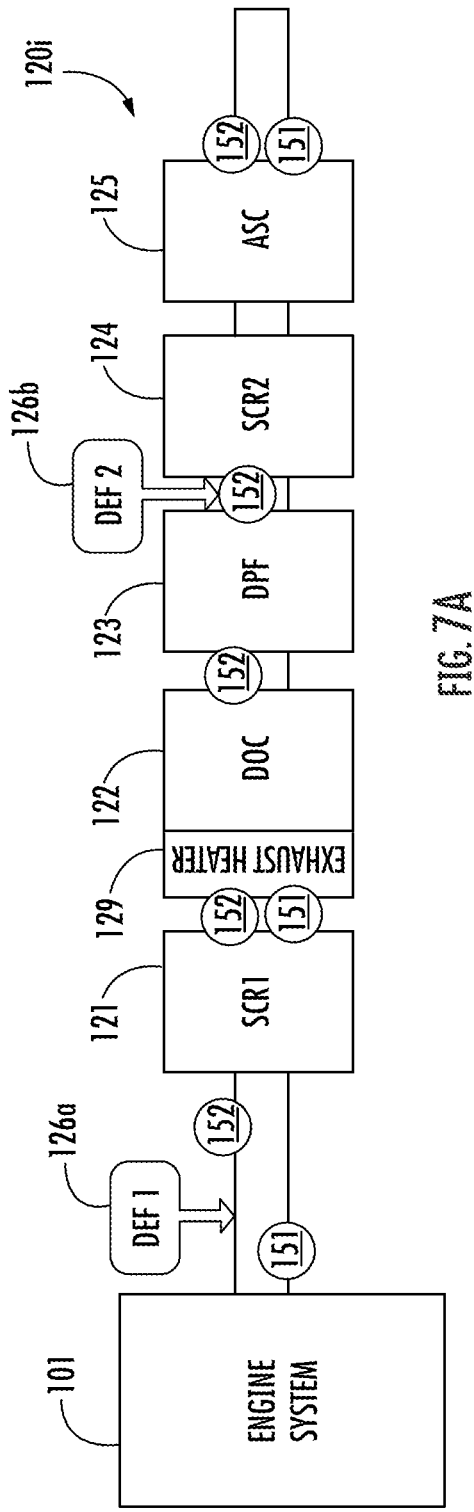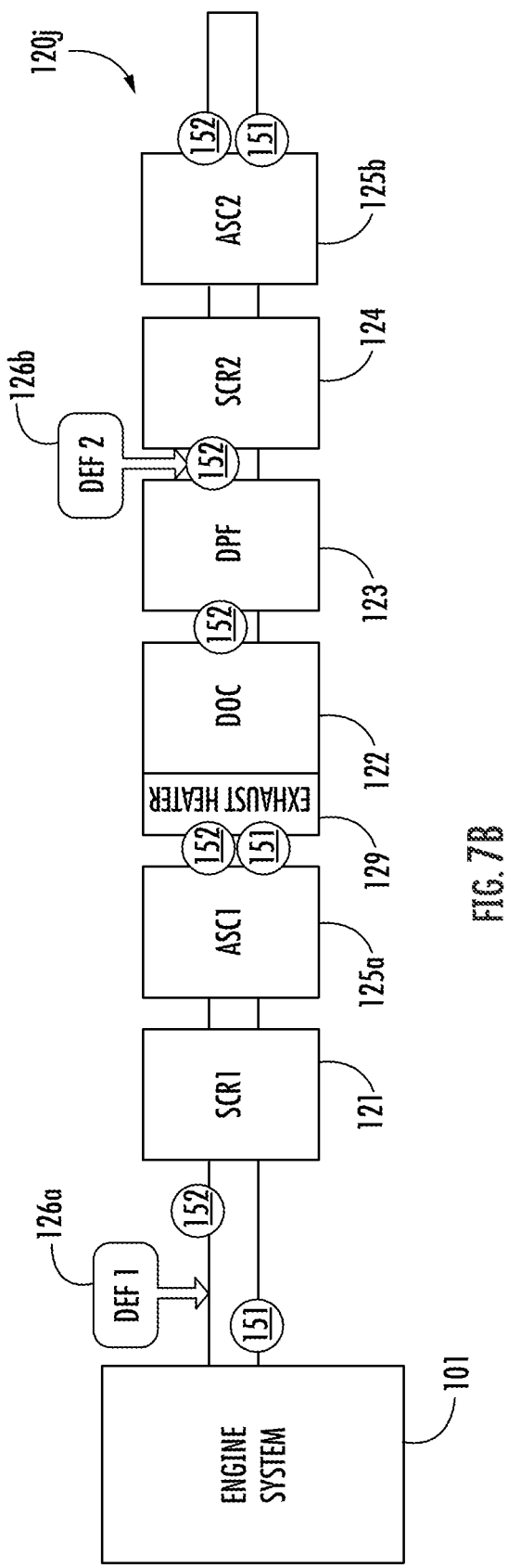

SYSTEMS AND METHODS FOR CONTROLLING EXHAUST GAS EMISSIONS OF A MULTIPLE SCR AFTERTREATMENT SYSTEM

CROSS-REFERENCE TO RELATED APPLICATION

This application claims the benefit of and priority to U.S. Provisional Application No. 63/251,156, filed Oct. 1, 2021, titled "SYSTEMS AND METHODS FOR CONTROLLING EXHAUST GAS EMISSIONS OF A MULTIPLE SCR AFTERTREATMENT SYSTEM," which is incorporated herein by reference in its entirety.

TECHNICAL FIELD

The present disclosure relates to exhaust aftertreatment systems and operation of exhaust aftertreatment systems. More particularly, the present disclosure relates to exhaust aftertreatment systems equipped with at least two selective catalytic reduction (SCR) systems and methods for operating same to, among other benefits, manage and maintain relatively low nitrous oxide (NOx) emissions across a variety of operating conditions.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants. However, as the regulations increase in strictness, improved systems and methods are needed to comply with these relatively stricter regulations.

SUMMARY

One embodiment relates to a method. The method may manage emissions from a multiple SCR exhaust aftertreatment system across a variety of conditions (e.g., a temperature of each of the SCR systems, a stored ammonia amount for each of the SCR systems, a combination thereof, and so on). The method includes: receiving, by a controller, data indicative of a catalyst of an aftertreatment system; determining, by the controller, a reductant dosing strategy based on a comparison of the data indicative of the catalyst to a respective threshold; and commanding, by the controller, an amount of reductant dosing based on the determined reductant dosing strategy.

The aftertreatment system may include a first Selective Catalytic Reduction (SCR) catalyst and a second SCR catalyst. In the method, the catalyst is at least one of the first SCR catalyst or the second SCR catalyst. Accordingly, commanding the amount of fluid dosing may comprise: determining that a first temperature regarding the first SCR catalyst is above a first temperature threshold and a second temperature regarding the second SCR catalyst is below a second temperature threshold; commanding a first reductant doser upstream of the first SCR catalyst to dose the first SCR catalyst with reductant; and commanding a second reductant doser upstream of the second SCR catalyst to cease dosing of the second SCR catalyst with reductant.

The method may further include: determining, by the controller and based on the data indicative of the catalyst, a thermal management mode; and commanding, by the controller, at least one of a heater or an engine to increase a temperature of the catalyst based on the thermal management mode.

Another embodiment relates to an exhaust aftertreatment system. The exhaust aftertreatment system includes: a first selective catalyst reduction (SCR) system coupled to a first reductant doser; a second SCR system coupled to a second reductant doser, whereby the second SCR system and the second reductant doser are disposed downstream from the first SCR system and the first reductant doser; and a controller coupled to the first and second SCR systems and the first and second reductant dosers. The controller is configured to: receive data indicative of a temperature of the first SCR system; receive data indicative of a temperature of the second SCR system; in response to the temperature of the first SCR system and the second SCR system being below a predefined temperature threshold, cease dosing from the first and second reductant dosers; and in response to the temperature of the first SCR system being at or above the predefined temperature threshold and the temperature of the second SCR system being below the predefined temperature threshold, command dosing from the first reductant doser and cease dosing from the second reductant doser.

In some embodiments and in response to the temperature of the first SCR system being at or above the predefined temperature threshold and the temperature of the second SCR system being at or above the predefined temperature threshold, the controller is further configured to command dosing from each of the first and second reductant dosers.

In some embodiments and in response to the temperature of the first SCR system being at or above the predefined temperature threshold and the temperature of the second SCR system being at or above the predefined temperature threshold, the controller is further configured to command relatively more dosing from the second reductant doser than from the first reductant doser.

Yet another embodiment relates to an apparatus. The apparatus includes one or more processors and one or more memory devices coupled to the one or more processors. The one or more memory devices store instructions that, when executed by the one or more processors, cause the one or more processors to: receive data indicative of a catalyst of an aftertreatment system; determine a reductant dosing strategy based on a comparison of the data indicative of the catalyst to a respective threshold; and command an amount of reductant dosing based on the determined reductant dosing strategy.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Additionally, one or more features of an aspect of the invention may be combined with one or more features of a different aspect of the invention.

BRIEF DESCRIPTION OF THE FIGURES

FIG. 3A is an example architecture of an aftertreatment system of the system of FIG. 1, according to an exemplary embodiment.

FIG. 3B is an example architecture of an aftertreatment system of the system of FIG. 1, according to an exemplary embodiment.

FIG. 4A is an example architecture of an aftertreatment system of the system of FIG. 1, according to an exemplary embodiment.

FIG. 4B is an example architecture of an aftertreatment system of the system of FIG. 1, according to an exemplary embodiment.

FIG. 7A is an example architecture of an aftertreatment system of the system of FIG. 1, according to an exemplary embodiment.

FIG. 7B is an example architecture of an aftertreatment system of the system of FIG. 1, according to an exemplary embodiment.

DETAILED DESCRIPTION

Figure 1:
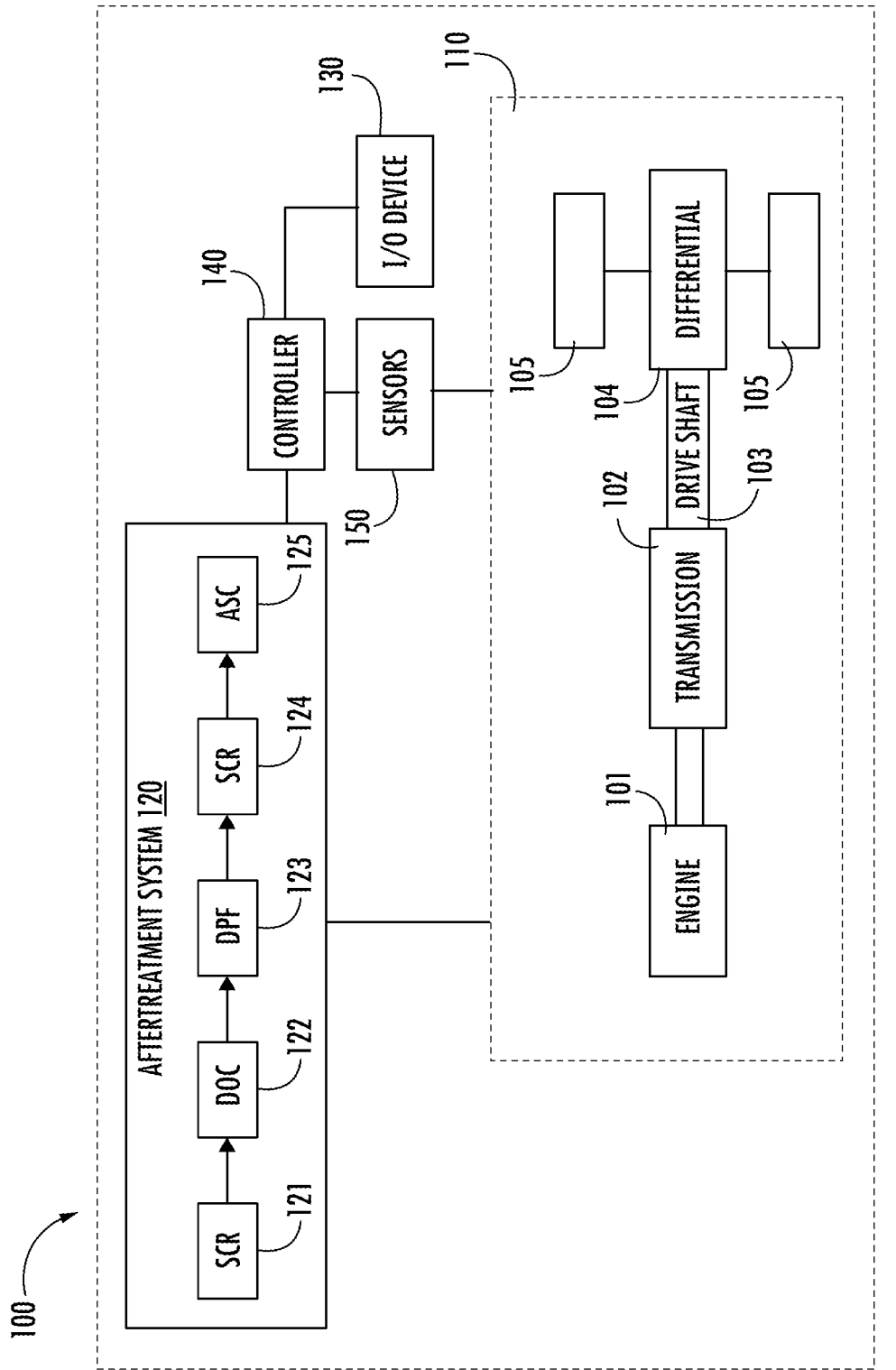
FIG. 1 is a schematic diagram of a system, according to an exemplary embodiment.

Following below are more detailed descriptions of various concepts related to, and implementations of, methods, apparatuses, and systems for managing a multiple, and particularly a dual, SCR exhaust aftertreatment system according to one or more determined dosing strategies. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Referring to the Figures generally, the various embodiments disclosed herein relate to systems, apparatuses, and methods for receiving data indicative of operating characteristics of components of a dual-SCR aftertreatment system and commanding or continuously adjusting reductant dosing based on this data. As described herein, the exhaust aftertreatment system may include a first SCR (or SCRF) catalyst (Cu, Fe, Va), which may or may not include an NH3 slip catalyst (ASC), and one or more second SCR or SCRF catalysts (Cu, Fe, Va) with a downstream ASC. The system may also include additional catalyst elements between the first and second SCRs, such as DOC, DPF, DOConDPF, SCRF etc. The system includes a first reductant doser, which may be closely-coupled to an engine turbocharger outlet, upstream of the first SCR catalyst. The pathway from the close-coupled doser to the first SCR catalyst may or may not include an additional exhaust mixer. A second reductant doser is mounted upstream of the second SCR catalyst, and downstream of the first SCR catalyst and any intermediate catalysts. The system includes multiple physical or virtual exhaust species sensors which can detect the concentrations of NOx and NH3 in the exhaust stream. The system includes multiple physical or virtual temperature sensors which can measure the gas/solid temperatures at various positions within the system. The system include multiple physical or virtual sensors which can detect the stored NH3 distribution on the SCR catalysts. The first and second reductant dosers are controlled, by a controller, independently using the various sensors in the system as described herein. Furthermore, an engine operating mode (e.g., thermal management modes) is varied to increase a temperature of the SCR catalysts based on the sensed temperatures and NH3 storage distributions as described herein. The system may also include supplemental exhaust heat addition, such as via electric exhaust gas heaters, electrically heated catalyst elements, or other such devices.

As described herein, the present disclosure provides various improvements over conventional systems and many benefits. As described herein, the controller of the dual-SCR system controls tailpipe NOx over a wide range of engine operating conditions, particularly at low engine loads, while also maintaining acceptable passive soot oxidation rates in a diesel particulate filter (DPF). This is achieved by the controller modulating reductant dosing rates in the first and second SCR catalysts based on a number of sensed characteristics of the system. The first and second SCRs can be used individually or together depending on the engine operating condition to maximize full-system NOx conversion. The present disclosure also ties the sensed parameters of both SCR catalysts (e.g., temperature and predicted ammonia (NH3) storage) to the operation of engine thermal management modes to allow for flexible optimization of engine performance and fuel economy.

It should be understood that while the systems and methods described herein are described primarily with respect to a two-SCR aftertreatment system that this depiction is not meant to be limiting. The principles and features may also be applied to more than two SCR aftertreatment systems. Additionally, the principles and features may also be applied to single SCR aftertreatment systems.

Referring now to FIG. 1, a system 100 is shown, according to an example embodiment. The system 100 includes an engine system 110 (e.g., powertrain system), an aftertreatment system 120 coupled to the engine system 110, an operator input/output (I/O) device 130, and a controller 140, where the controller 140 is coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, midrange trucks (e.g., pick-up truck, etc.), sedans, coupes, tanks, airplanes, boats, and any other type of vehicle that includes a SCR aftertreatment system. In another embodiment, the system 100 may be embodied in a stationary piece of equipment, such as a power generator or genset. All such variations are intended to fall within the scope of the present disclosure.

As shown in FIG. 1, the engine system 110 includes an engine 101 and a transmission 102. The transmission 102 is operatively coupled to a drive shaft 103, which is operatively coupled to a differential 104, where the differential 104 transfers power output from the engine 101 to the final drive (shown as wheels 105) to propel the system 100. In other embodiments, the final drive may correspond to the vehicle type (e.g., a propeller for a marine vehicle) and be excluded in still other embodiments (e.g., a genset embodiment).

The engine 101 may be any type of internal combustion engine that generates exhaust gas, such as a gasoline, natural gas, and/or diesel engine, and/or any other suitable engine. In some embodiments, the engine 101 may be embodied in a hybrid engine system (e.g., a combination of the internal combustion engine and an electric motor). In the example shown, the engine 101 is a diesel-powered compression-ignition engine. The engine 101 includes one or more cylinders and associated pistons. Air from the atmosphere is combined with fuel, and combusted, to produce power for the vehicle. Combustion of the fuel and air in the compression chambers of the engine 101 produces exhaust gas that is operatively vented to an exhaust pipe and to the exhaust aftertreatment system.

The transmission 102 receives power from the engine 101 and provides rotational power to a final drive (shown as wheels 105) of the system 100. In some embodiments, the transmission 102 is a continuously variable transmission (CVT). In other embodiments, the transmission 102 is a geared transmission comprising a plurality of gears. The transmission 102 may be an automatic, manual, automatic manual, etc. type of transmission. The transmission 102 may include one or more sensors (virtual or real) that couple to the controller 140 and provide information or data regarding operation of the transmission 102 (e.g., the current gear or operating mode, a temperature in the transmission box, etc.).

The aftertreatment system 120 is in exhaust-gas receiving communication with the engine 101. The aftertreatment system includes a diesel particulate filter (DPF) 123, a diesel oxidation catalyst (DOC) 122, a first selective catalytic reduction (SCR) system 121, a second SCR system 124 and an ammonia slip catalyst (ASC) 125. The DOC 122 is structured to receive the exhaust gas from the engine 101 and to oxidize hydrocarbons and carbon monoxide in the exhaust gas. The DPF 123 is arranged or positioned downstream of the DOC 122 and structured to remove particulates, such as soot, from exhaust gas flowing in the exhaust gas stream. The DPF 123 includes an inlet, where the exhaust gas is received, and an outlet, where the exhaust gas exits after having particulate matter substantially filtered from the exhaust gas and/or converting the particulate matter into carbon dioxide. In some implementations, the DPF 123 or other components may be omitted. Additionally, although a particular arrangement is shown for the aftertreatment system 120 in FIG. 1, the arrangement of components within the aftertreatment system 120 may be different in other embodiments. In particular, as shown in FIGS. 3A-9B, various alternative architectures for the aftertreatment system 120 are shown.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be liquid or gas. The reductant may be, for example, urea, Adblue®, a urea water solution (UWS), an aqueous urea solution (e.g., AUS32, etc.), and other similar fluids. The terms reductant and diesel exhaust fluid (DEF) are used interchangeably herein. Reductant is added to the exhaust gas stream to aid in the catalytic reduction. In another embodiment, the reductant may be an ammonia or an ammonia-based solution and may be injected directly such that the conversion of urea to ammonia may be excluded or reduced. The reductant may be injected upstream of the SCR 121 generally (or in particular, the SCR catalyst) by a DEF doser (also referred to herein as a reductant doser) such that the SCR catalyst receives a mixture of the reductant and exhaust gas. The reductant (when not ammonia) droplets then undergo the processes of evaporation, thermolysis, and hydrolysis to form gaseous ammonia within the decomposition chamber, the SCR catalyst, and/or the exhaust gas conduit system, which leaves the aftertreatment system 120. In some embodiments, multiple reductant dosers may be included throughout the aftertreatment system 120 in order to introduce reductant at multiple points in the exhaust flow stream. For example, a first reductant doser (i.e., first reductant doser 126a of FIG. 3A) may be located relatively further upstream of the aftertreatment system 120 components (e.g., the first SCR 121, etc.)(i.e., closer to the engine), while a second reductant doser (i.e., second reductant doser 126b of FIG. 3A) may be located relatively further downstream of the first reductant doser but upstream of the second SCR 124.

The aftertreatment system 120 may further include an oxidation catalyst (e.g., the DOC 122) fluidly coupled to the exhaust gas conduit system to oxidize hydrocarbons and carbon monoxide in the exhaust gas. In order to properly assist in this reduction, the DOC 122 may be required to be at a certain operating temperature. In some embodiments, this certain operating temperature is approximately between 200-500° C. In other embodiments, the certain operating temperature is the temperature at which the conversion efficiency of the DOC 122 exceeds a predefined threshold (e.g., the conversion of HC to less harmful compounds, which is known as the HC conversion efficiency).

The SCR system (i.e., the first SCR 121 and second SCR 124) is configured to assist in the reduction of emissions, and particularly NOx emissions, by accelerating a NOx reduction process between the ammonia and the NOx of the exhaust gas into diatomic nitrogen and water. If the SCR catalyst is not at or above a certain temperature, the acceleration of the NOx reduction process is limited and the SCR may not be operating at a level of efficiency to meet various regulations. In some embodiments, this certain temperature is approximately 200-600° C.

The SCR system includes a catalyst that may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.). In one embodiment, the first SCR 121 and second SCR 124 include the same catalyst construction (e.g., same active catalyst and inactive substrate but may be of relatively different sizes in order to fit within the system). In another embodiment, the first SCR 121 and second SCR 124 are of different catalyst constructions. It should be understood that the SCR catalyst may be included on any type of substrate (e.g., flow-through, wall-flow filter, partial flow filter, other filtration media, etc.) and is not limited to the specifically identified SCR and/or SCRF in the FIGURES and herein.

As shown in FIG. 1, two SCR systems may be included in the aftertreatment system 120. The first SCR 121 is positioned relatively closer (i.e., upstream) to the engine 101 than the second SCR 124 system. The first SCR 121 may be relatively smaller in size (e.g., packaging/container and catalyst size) than the second SCR 124, which may be due to spatial constraints. The first SCR 121 is fluidly coupled to its own dedicated reductant doser (e.g., first reductant doser 126*a*). The second SCR 124 may be a relatively larger SCR system and is fluidly coupled to its own dedicated reductant doser (e.g., the second reductant doser 126*b*). Due to the proximity to the engine 101 and its size, the first SCR 121 heats up relatively more quickly than the second SCR 124. In turn, the first SCR 121 may convert NOx quickly due to its smaller size, but packaging constraints make the first SCR 121 too small to be the only SCR system on the engine because the smaller catalyst is insufficient for converting desired amounts of NOx associated with standard engine 101 operation. The second SCR 124 may be analogous to an SCR system in a one-SCR architecture, meaning that the larger SCR system takes more time to heat to an operating temperature but is then capable of converting the amounts of NOx associated with standard engine 101 operation.

When ammonia in the exhaust gas does not react with the SCR catalyst (either because the SCR is below an operating temperature or because the amount of dosed ammonia greatly exceeds the amount of NOx), the unreacted ammonia may bind to the SCR catalyst, becoming stored in the SCR. This stored ammonia may be released from the SCR as the SCR warms uncontrollably, which can cause issues if the amount of ammonia released is greater than the amount of NOx passing through (i.e., more ammonia than needed for the amount of NOx, which can lead to ammonia slip). In some embodiments, an ASC 125 is included and structured to address ammonia slip by removing at least some excess ammonia from the treated exhaust gas before the treated exhaust gas is released into the atmosphere. As exhaust gas passes through the ASC 125, some of unreacted ammonia (i.e., unreacted with NOx) remaining in the exhaust gas is partially oxidized to limited ammonia emissions. However and similar to the SCR catalyst, if the ASC 125 is not at or above a certain temperature, the acceleration of the NH3 oxidization process is limited and the ASC 125 may not be operating at a level of efficiency to meet regulations or desired parameters. In some embodiments, this certain temperature is approximately 250-300° C. Although a single ASC 125 is discussed, in some embodiments, multiple ASCs (e.g., a first ASC 125*a*, a second ASC 125*b*) are included in the aftertreatment system 120.

In some embodiments, multiple aftertreatment system components are combined into a single component. For example, an SCR (e.g., the second SCR 124) may be combined with the DPF 123 to form a single Selective Catalytic Reduction Filter (SCRF) that simultaneously performs the functions of the DPF 123 (i.e., filtering out particulate matter from the exhaust) and the second SCR 124 (i.e., reducing an amount of NOx in the exhaust stream). An SCRF 128 is discussed in greater detail with reference to FIGS. 5A-B. In another example, the DOC 122 and DPF 123 may be combined to form a single DOC-on-DPF component that simultaneously performs the functions of the DOC 122 (i.e., oxidizing HC in the exhaust stream) and the DPF 123. A DOC-on-DPF 127 is discussed in greater detail with reference to FIGS. 4A-B.

In some embodiments, a heater 129 is included. The heater 129 may be any sort of heat source that can be structured to increase the temperature of passing exhaust gas, which, in turn, increases the temperature of components in the aftertreatment system 120, such as the first SCR 121, the DOC 122, the DPF 123, etc. As such, the heater may be an electric heater, a grid heater, a heater within the SCR 121, an induction heater, a microwave, or a fuel-burning (e.g., HC fuel) heater. In the example shown, the heater 129 is electrically-powered and controlled by the controller 140 (such as during an active regeneration event in order to heat the exhaust gas (e.g., by convection)). Alternatively, the heater may be positioned proximate a desired component to heat the component (e.g., DPF) by conduction (and possibly convection). Multiple heaters may be used with the exhaust aftertreatment system, and each may be structured the same or differently (e.g., conduction, convection, etc.). For example, the heater may be coupled to the first SCR 121 (e.g., FIGS. 6A-B), the DOC 122 (e.g., FIGS. 7A-B), or the DPF 123 (e.g., FIGS. 7A-B).

Still referring to FIG. 1, as also shown, sensors 150 are included in the system 100. The sensors are coupled to the controller 140, such that the controller 140 can monitor and acquire data indicative of operation of the system 100. The sensors 150 may include sensors positioned and/or structured to monitor operating characteristics or parameters of various components of the system 100. By way of example, the sensors 150 may include temperature sensors structured to acquire data indicative of a temperature of exhaust gas. These temperature sensors (e.g., temperature sensor 152) may be included throughout the aftertreatment system 120, and various example positions are shown in FIGS. 3A-9B. The sensors 150 may include a concentration sensor structured to acquire data indicative of a concentration of particulate matter (e.g., soot), pollutants (e.g., NOx), and/or other compounds of interest (e.g., NH3) in the exhaust gas stream. These concentration sensors (e.g., concentration sensor 151) may be included throughout the aftertreatment system 120, and various example positions are shown in FIGS. 3A-9B. The sensors 150 may further include an ammonia sensor structured to acquire data indicative of an amount of ammonia stored on each of the first SCR 121 and the second SCR 124.

As discussed, FIGS. 3A-9B present various architectures for the aftertreatment system 120. As used herein, 'architectures' refers to particular configurations, combinations, and arrangements of aftertreatment system 120 components. FIG. 3A shows a first architecture 120*a* that includes the first SCR 121, the DOC 122, the DPF 123, the second SCR 124, and the ASC 125. A first reductant doser 126*a* is shown upstream of the first SCR 121 and the second reductant doser 126*b* is shown upstream of the second SCR 124. FIG. 3B shows a second architecture 120*b* that is similar to the first architecture 120*a* but includes a first ASC 125*a* immediately downstream of the first SCR 121 with a second ASC 125*b* immediately downstream of the second SCR 124 (at the same location as the ASC 125 of the first architecture 120*a*). FIG. 4A shows a third architecture 120*c* that includes the first SCR 121, the DOC-on-DPF 127, the second SCR 124, and the ASC 125. A first reductant doser 126*a* is shown upstream of the first SCR 121 and the second reductant doser 126*b* is shown upstream of the second SCR 124. FIG. 4B shows a fourth architecture 120*d* that is similar to the third architecture 120*c* but includes a first ASC 125*a* immediately downstream of the first SCR 121 with a second ASC 125*b* immediately downstream of the second SCR 124 (at the same location as the ASC 125 of the third architecture 120*c*).

Figure 5A:
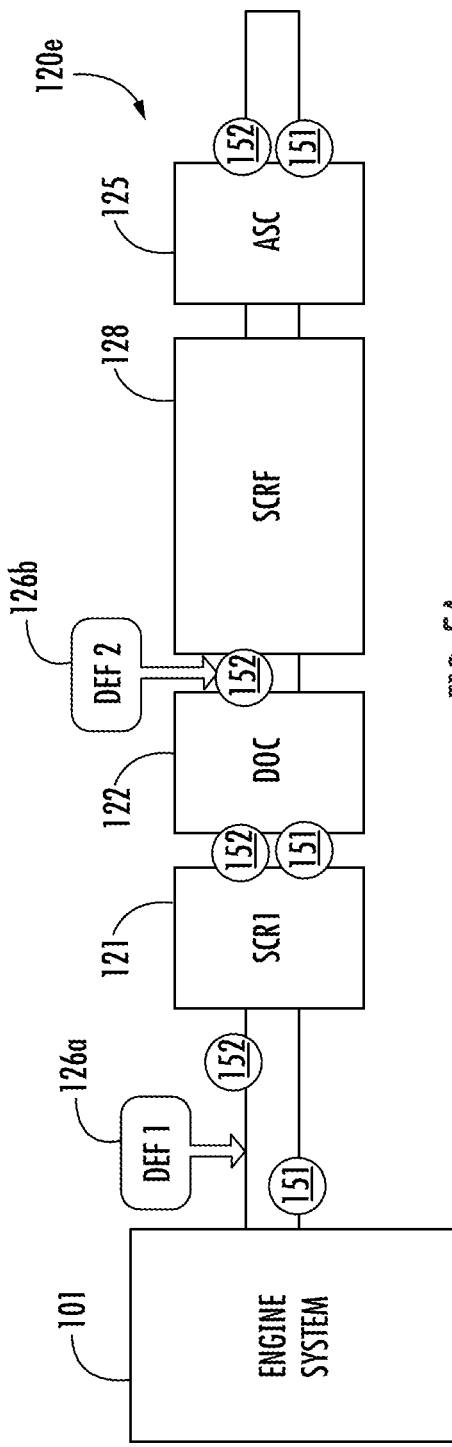
FIG. 5A is an example architecture of an aftertreatment system of the system of FIG. 1, according to an exemplary embodiment.
Figure 5B:
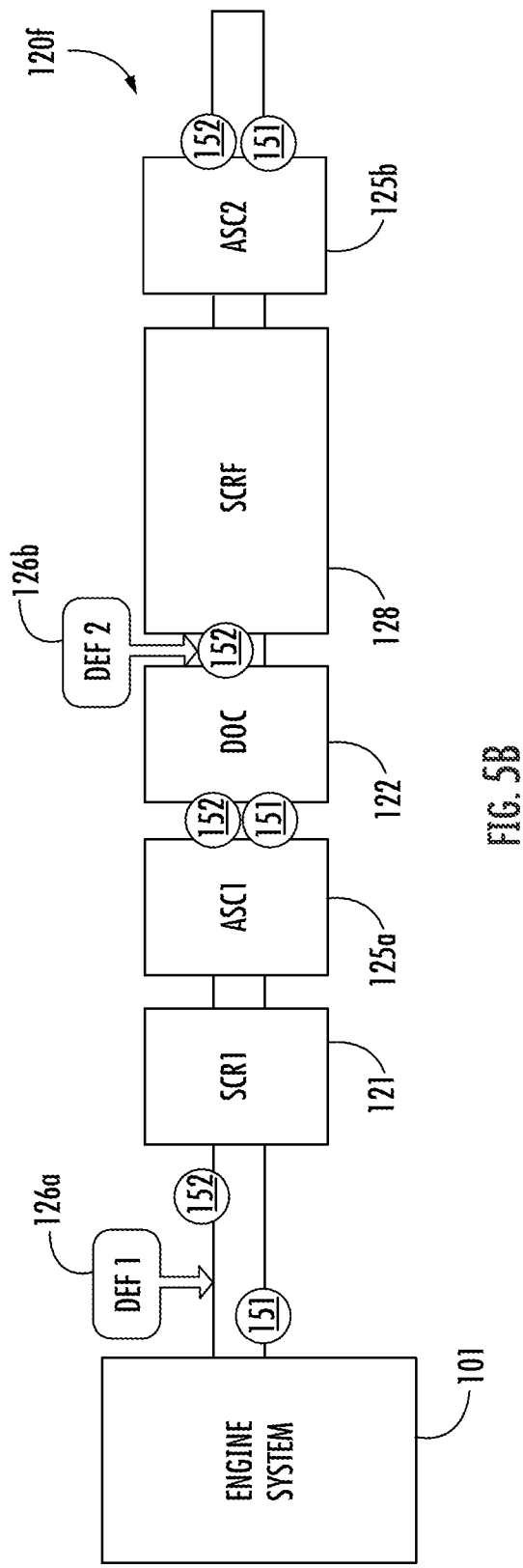
FIG. 5B is an example architecture of an aftertreatment system of the system of FIG. 1, according to an exemplary embodiment.
Figure 6A:
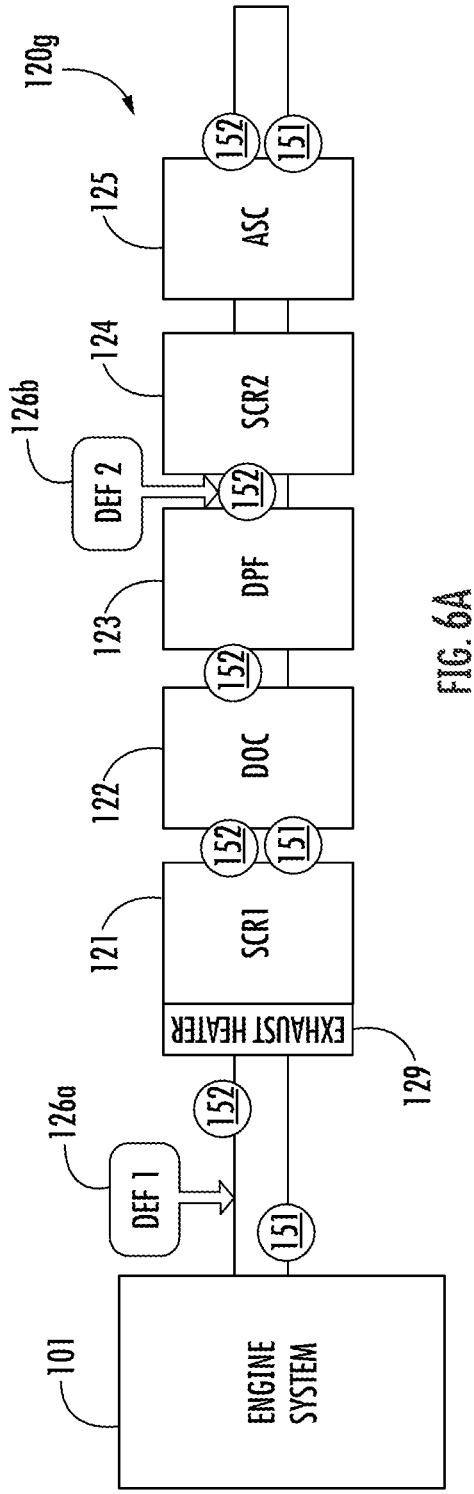
FIG. 6A is an example architecture of an aftertreatment system of the system of FIG. 1, according to an exemplary embodiment.
Figure 6B:
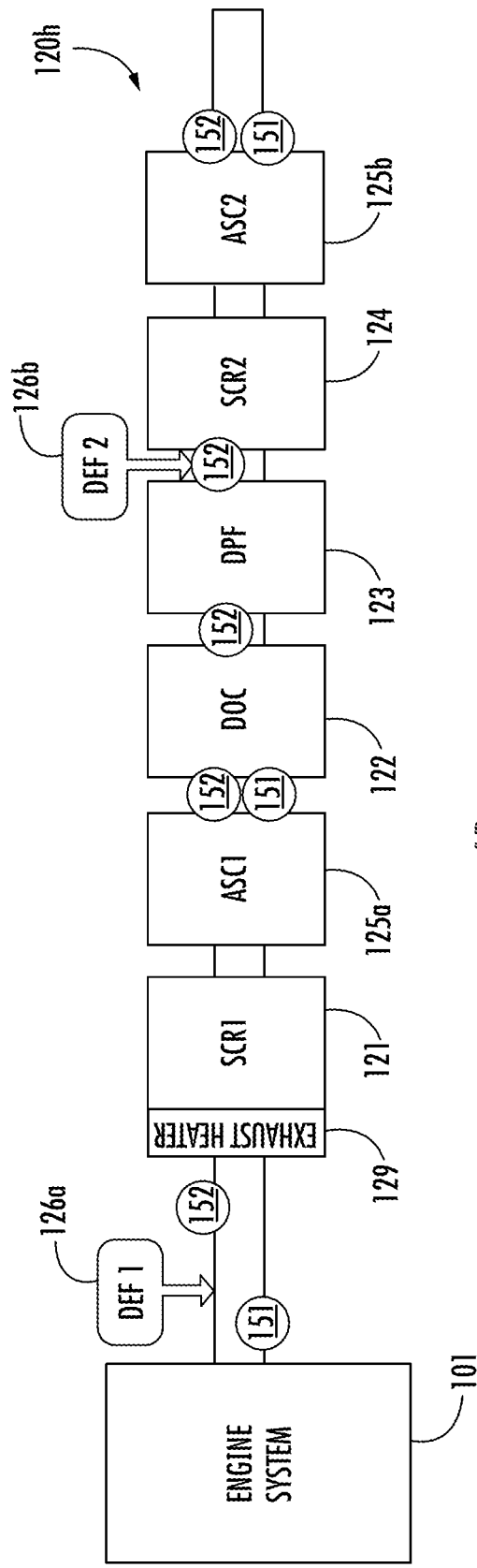
FIG. 6B is an example architecture of an aftertreatment system of the system of FIG. 1, according to an exemplary embodiment.

FIG. 5A shows a fifth architecture 120*e* that includes the first SCR 121, the DOC 122, a SCRF 128, and the ASC 125. A first reductant doser 126*a* is shown upstream of the first SCR 121 and the second reductant doser 126*b* is shown upstream of the SCRF 128. FIG. 5B shows a sixth architecture 120*f* that is similar to the fifth architecture 120*e* but includes a first ASC 125*a* immediately downstream of the first SCR 121 with a second ASC 125*b* immediately downstream of the SCRF 128 (at the same location as the ASC 125 of the fifth architecture 120*e*). FIG. 6A shows a seventh architecture 120*g* that includes the first SCR 121, the DOC 122, the DPF 123, the second SCR 124, and the ASC 125. A heater 129 is coupled to the first SCR 121. A first reductant doser 126*a* is shown upstream of the first SCR 121 and the second reductant doser 126*b* is shown upstream of the second SCR 124. FIG. 6B shows an eighth architecture 120*h* that is similar to the seventh architecture 120*f* but includes a first ASC 125*a* immediately downstream of the first SCR 121 with a second ASC 125*b* immediately downstream of the second SCR 124 (at the same location as the ASC 125 of the seventh architecture 120*f*).

Figure 8A:
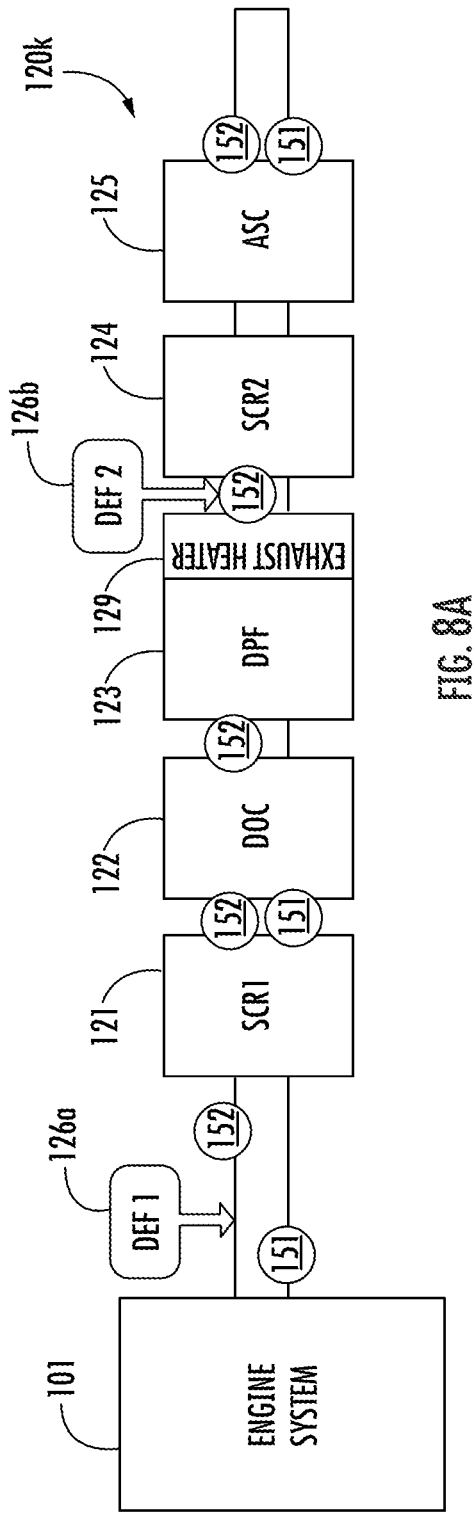
FIG. 8A is an example architecture of an aftertreatment system of the system of FIG. 1, according to an exemplary embodiment.
Figure 8B:
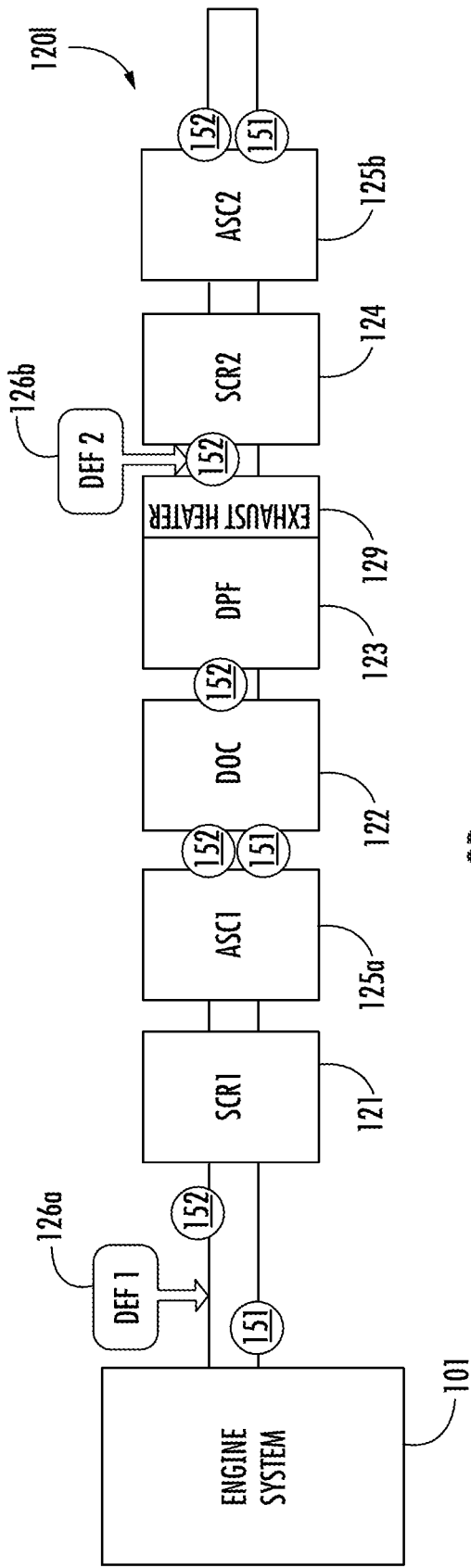
FIG. 8B is an example architecture of an aftertreatment system of the system of FIG. 1, according to an exemplary embodiment.

FIG. 7A shows a ninth architecture 120*i* that includes the first SCR 121, the DOC 122, the DPF 123, a second SCR 124, and the ASC 125. A heater 129 is coupled to the DOC 122. A first reductant doser 126*a* is shown upstream of the first SCR 121 and the second reductant doser 126*b* is shown upstream of the second SCR 124. FIG. 7B shows a tenth architecture 120*j* that is similar to the ninth architecture 120*i* but includes a first ASC 125*a* immediately downstream of the first SCR 121 with a second ASC 125*b* immediately downstream of the second SCR 124 (at the same location as the ASC 125 of the ninth architecture 120*i*). FIG. 8A shows an eleventh architecture 120*k* that includes the first SCR 121, the DOC 122, the DPF 123, the second SCR 124, and the ASC 125. A heater 129 is coupled to the DPF 123. A first reductant doser 126*a* is shown upstream of the first SCR 121 and the second reductant doser 126*b* is shown upstream of the second SCR 124. FIG. 8B shows a twelfth architecture 120*l* that is similar to the eleventh architecture 120*k* but includes a first ASC 125*a* immediately downstream of the first SCR 121 with a second ASC 125*b* immediately downstream of the second SCR 124 (at the same location as the ASC 125 of the eleventh architecture 120*k*).

Figure 9:
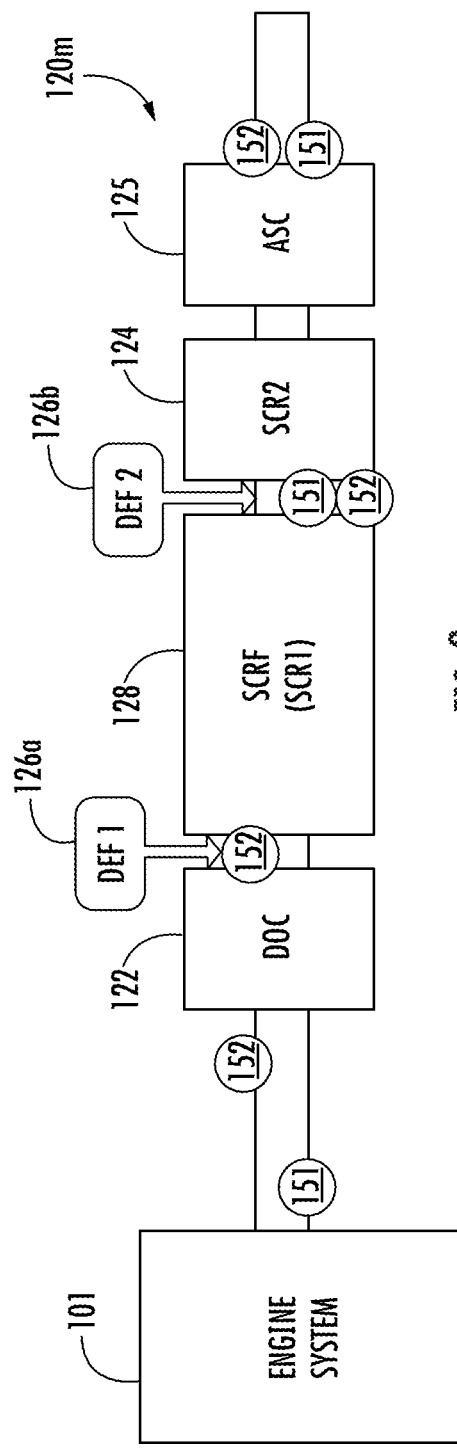
FIG. 9 is an example architecture of an aftertreatment system of the system of FIG. 1, according to an exemplary embodiment.

FIG. 9 shows a thirteenth architecture 120*m* that includes the DOC 122, the SCRF 128, the second SCR 124, and the ASC 125. A first reductant doser 126*a* is shown upstream of the SCRF 128 and the second reductant doser 126*b* is shown upstream of the second SCR 124.

Referring back to FIG. 1, an operator input/output (I/O) device 130 is also shown. The operator I/O device 130 may be coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECU), such as one or more microcontrollers. Accordingly, the controller 140 may be separate from or included with at least one of a transmission control unit, an exhaust aftertreatment control unit, a powertrain control module, an engine control module, etc. The function and structure of the controller 140 is described in greater detail in FIG. 2. The function and structure of the controller 140 is described in greater detail in FIG. 2.

Figure 2:
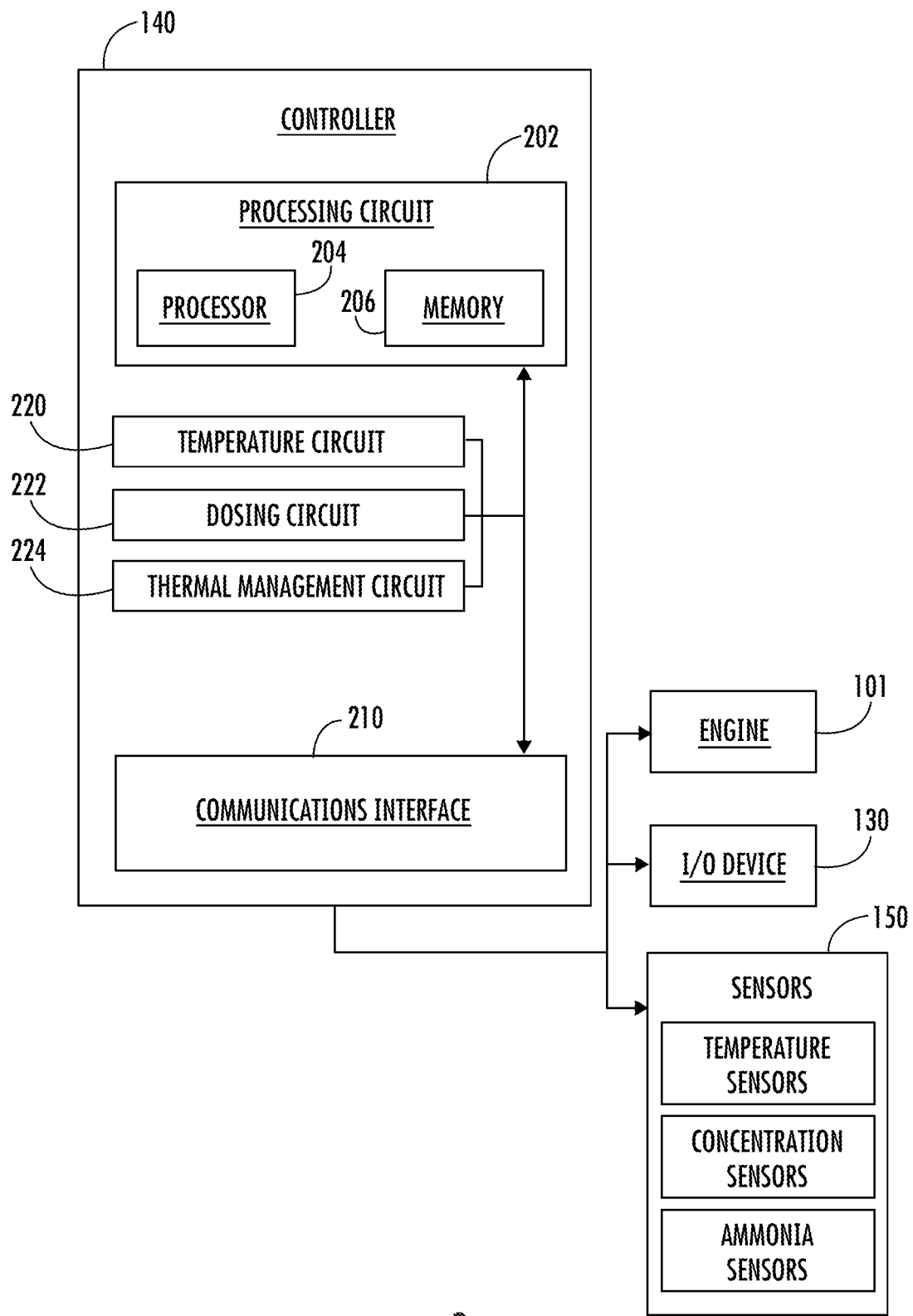
FIG. 2 is a schematic diagram of the controller of the system of FIG. 1 coupled to other components of the system of FIG. 1, according to an exemplary embodiment.

Referring now to FIG. 2, a schematic diagram of the controller 140 coupled to various components of the system 100 of FIG. 1 is shown, according to an example embodiment. As shown in FIG. 2, the controller 140 includes a processing circuit 202 having a processor 204 and a memory 206, a temperature circuit 220, a dosing circuit 222, and a thermal management circuit 224, and a communications interface 210. The controller 140 is structured to receive data indicative of operation (e.g., operating characteristics) of various components in the aftertreatment system 120 and to modulate reductant dosing from the first and second reductant dosers 126*a* and 126*b* based on this data. Furthermore, the controller 140 may initiate one of several thermal management modes to supplement the dosing commands based on this data in order to promote catalytic activity and maintain or manage emissions from the engine-exhaust aftertreatment system (e.g., maintain NOx emissions below a predefined threshold, minimize particulate matter emissions, minimize greenhouse gases emissions, etc.).

In one configuration, the temperature circuit 220, the dosing circuit 222, and the thermal management circuit 224 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the temperature circuit 220, the dosing circuit 222, and the thermal management circuit 224 are embodied as hardware units, such as electronic control units. As such, the temperature circuit 220, the dosing circuit 222, and the thermal management circuit 224 may be embodied as one or more circuitry components including, but not limited to, processing circuitry, network interfaces, peripheral devices, input devices, output devices, sensors, etc. In some embodiments, the temperature circuit 220, the dosing circuit 222, and the thermal management circuit 224 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the temperature circuit 220, the dosing circuit 222, and the thermal management circuit 224 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The temperature circuit 220, the dosing circuit 222, and the thermal management circuit 224 may also include programmable hardware devices such as field programmable gate arrays, programmable array logic, programmable logic devices or the like. The temperature circuit 220, the dosing circuit 222, and the thermal management circuit 224 may include one or more memory devices for storing instructions that are executable by the processor(s) of the temperature circuit 220, the dosing circuit 222, and the thermal management circuit 224. The one or more memory devices and processor(s) may have the same definition as provided below with respect to the memory 206 and processor 204. In some hardware unit configurations and as alluded to above, the temperature circuit 220, the dosing circuit 222, and the thermal management circuit 224 may be geographically dispersed throughout separate locations in the vehicle. Alternatively and as shown, the temperature circuit 220, the dosing circuit 222, and the thermal management circuit 224 may be embodied in or within a single unit/housing, which is shown as the controller 140.

In the example shown, the controller 140 includes the processing circuit 202 having the processor 204 and the memory 206. The processing circuit 202 may be structured or configured to execute or implement the instructions, commands, and/or control processes described herein with respect to the temperature circuit 220, the dosing circuit 222, and the thermal management circuit 224. The depicted configuration represents the temperature circuit 220, the dosing circuit 222, and the thermal management circuit 224 as machine or computer-readable media storing instructions. However, as mentioned above, this illustration is not meant to be limiting as the present disclosure contemplates other embodiments where the temperature circuit 220, the dosing circuit 222, and the thermal management circuit 224, or at least one circuit of the temperature circuit 220, the dosing circuit 222, and the thermal management circuit 224, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), other programmable logic devices, discrete gate or transistor logic, discrete hardware components, or any combination thereof designed to perform various functions described herein. A processor may be a processor, a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the temperature circuit 220, the dosing circuit 222, and the thermal management circuit 224 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory device, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication). Alternatively or additionally, a telematics unit may be included with the vehicle to facilitate and enable out-of-vehicle communications (rather than being enabled via the communications interface 210 directly of the controller).

The temperature circuit 220 is structured or configured to receive data indicative of a temperature of one or more aftertreatment system 120 components, the exhaust gas, and/or another component or element and determine a control strategy based on the temperature. For virtual temperature sensors, the temperature circuit 220 is structured to determine a temperature at various locations based on operating data regarding the system (e.g., engine speed/torque, exhaust gas flow rate, etc.) via one or more programs, algorithms, look-up tables, etc. (e.g., a correlation via a 3-D table between engine power output, exhaust gas flow rate, and an associated temperature of exhaust gas at various locations). The temperature data may be received from the sensors 150 (in particular, the temperature sensors 152), and may include the temperature of at least one of the first SCR 121, the DOC 122, the DPF 123, the second SCR 124, the ASC 125, the DOC-on-DPF 127, the SCRF 128, or the exhaust gas exiting the aftertreatment system 120. In some embodiments, the temperature data is collected by sensors coupled directly to the aftertreatment system 120 components, such that the temperature data is of the components themselves. In other embodiments, the temperature data is collected by sensors in the exhaust gas stream, such that the temperature data is of the exhaust gas directly upstream (or downstream) of the components, which can be used to model or approximate the temperature of the one or more components. For example, the temperature of the first SCR 121 may be approximated as the temperature of the exhaust gas immediately upstream of the first SCR 121, as the first SCR 121 is expected to be or reach the temperature of the exhaust gas passing through the component.

Once the temperature circuit 220 has determined one or more temperatures of aftertreatment system 120 components and/or exhaust gas, the temperature circuit 220 determines a control strategy based on the temperatures. The 'control strategy' refers to a defined plan/strategy/process/etc. for managing an amount of reductant or DEF dosing in the aftertreatment system in order to meet, likely meet, or attempt to meet one or more objectives (e.g., comply with exhaust gas emissions regulations, such as NOx emissions regulations). In some embodiments, the temperature circuit 220 determines the control strategy based on a comparison of at least one of the temperatures of the first SCR 121 or of the second SCR 124 to a respective threshold and, in particular, to a plurality of temperature thresholds including a minimum temperature threshold and a maximum, higher temperature threshold.

As described herein, the temperature circuit 220 determines a first control strategy if both the first SCR 121 temperature is below a first temperature threshold (also referred to as a first minimum temperature threshold) and the second SCR 124 temperature is below a second temperature threshold (also referred to as a second minimum temperature threshold). The temperature circuit 220 determines a second control strategy if the first SCR 121 temperature is above the first temperature threshold but the second SCR 124 temperature is below the second temperature threshold. The temperature circuit 220 determines a third control strategy if both the first SCR 121 temperature is above the first temperature threshold and the second SCR 124 temperature is above the second temperature threshold. The temperature circuit 220 determines a fourth control strategy if the second SCR 124 temperature is above a third temperature threshold (also referred to as a maximum temperature threshold or a maximum temperature threshold for the second SCR). In this situation, additional reductant delivery is provided to the first SCR in order to achieve or attempt to achieve a desired system level NOx conversion value.

The values of the temperature thresholds may be set based on a desired operation of the first SCR 121 or second SCR 124. For example, the first temperature threshold may be set as a (minimum) temperature value or range of values below which the first SCR 121 fails to reach a (minimum) desired NOx conversion efficiency (e.g., 95%). In another example, the third temperature threshold (i.e., maximum temperature threshold for the SCR) may be set as a temperature value above which the second SCR 124 is no longer able to reach a desired NOx conversion efficiency.

In one embodiment, the first and second temperature thresholds may be the same values. In another embodiment, the first and second temperature thresholds may be different values. In operation and as described herein, the temperature proximate to or indicative of the first and second SCRs 121, 124 controls, at least partly, a complex dosing and, in some embodiments, thermal management mode of operation to raise, for example, NOx conversion efficiency and minimize degradation to the system. It should be understood that while the term "temperature threshold" is used herein that may signify that the threshold as being a singular value (e.g., 200° C.), that this description is not meant to be limiting as the temperature threshold may also refer to a range of values in some embodiments. In these embodiments, being above the threshold may refer to being above the highest value in the range while being below the threshold may refer to being below the lowest value in the range. When values are in the range, the controller may examine operation of the system (e.g., NOx conversion efficiency) to determine whether to classify/designate the temperature of the first and/or second SCRs as being above or below the temperature threshold.

The dosing circuit 222 is configured or structured to receive an indication of the determined control strategy from the temperature circuit 220 and data indicative of an amount of ammonia storage on aftertreatment system 120 components, and to command dosing from the first reductant doser 126a and/or the second reductant doser 126b based on same. Ammonia storage in the aftertreatment system and on particular components may be determined via a variety of different ways. In one embodiment, one or more ammonia sensors are included in the aftertreatment system and configured to track an amount of ammonia in the exhaust gas or at a particular location. This tracking may be absolute (e.g., an amount) or may be a rate (e.g., a PPM/unit of time). In either situation, the tracked value can be used to determine a stored ammonia amount, such as on the first and/or second SCR systems 121 and 124. In some embodiments, ammonia sensors may be excluded from the aftertreatment system 120 (e.g., due to cost reasons). In these embodiments, the amount of ammonia stored on the first and/or second SCR 121 and 124 (or elsewhere) may be based on operating data regarding the engine-exhaust aftertreatment system. For example, using a tracked dosing amount which is proportional to an amount of ammonia introduced in the system and a determined NOx conversion, an amount of unreacted and stored ammonia may be estimated by the controller. One or more look-up tables, programs, algorithms, formulas, equations, etc. may be used to correlate various operating characteristics (e.g., NOx conversion efficiency, dosing amount/rate, age of usage of system, etc.) to an estimated stored ammonia amount for each of the first and second SCRs 121 and 124. Thus, a variety of ways may be used to determine or estimate a stored ammonia amount on the first and second SCRs 121 and 124 that are intended to fall within the scope of the present disclosure.

If the dosing circuit 222 receives an indication of the first control strategy based on the first SCR 121 and second SCR 124 having temperatures below their respective lower first and second temperature thresholds, the dosing circuit 222 commands the first reductant doser 126a and the second reductant doser 126b to not dose, or to cease dosing if they were already dosing. Because both SCRs are below a temperature at which the SCRs convert NOx at a desired efficiency rate, dosing either SCR with reductant would lead to unreacted reductant, potentially ammonia slip (unreacted ammonia that is released into the environment) above predefined acceptable levels, and/or the accumulation of incompletely decomposed reductant (unevaporated reductant) within the aftertreatment system that may cause undesired damage to the system.

If the dosing circuit 222 receives an indication of the second control strategy (which indicates that the first SCR 121 is "warm" but the second SCR 124 remains below the second temperature threshold), then the dosing circuit 222 commands the second reductant doser 126b to not dose (or cease or stop dosing), and commands the first reductant doser 126a to dose in order to substantially maximize NOx conversion by the first SCR 121. As discussed above with regard to the first control strategy, the dosing circuit 222 commands no dosing for the second SCR 124 because any reductant dosed is likely to be left unreacted. However, because the first SCR 121 is "warm," the dosing circuit 222 commands an amount of reductant dosing that is commensurate with standard operation of a single-SCR aftertreatment system. "Warm", as used to describe the first and/or second SCR 121 and 124 refers to the SCR being at a temperature above a predefined temperature threshold. In some embodiments, a direct temperature measurement may be prohibited (e.g., an error or malfunction with the temperature sensor), such that being above the predefined temperature threshold may be based on other data, such as a NOx conversion efficiency being at or above a predefined conversion threshold. In any event, a primary goal for the dosing circuit 222 with the second control strategy is for DeNOx performance (i.e., reduction of NOx) at a low temperature for the first SCR 121.

If the dosing circuit 222 receives an indication of the third control strategy (i.e., the first SCR 121 and the second SCR 124 are both "warm"), the dosing circuit 222 commands substantially standard operation from the second reductant doser 126b (i.e., dosing reductant for the second SCR 124 as if the second SCR 124 was the sole SCR in a single-SCR aftertreatment system) in order to achieve a substantially maximum possible NOx conversion efficiency. In this regard, relatively more dosing may be commanded from the second reductant doser 126b during the third control strategy than the first reductant doser 126a (at least at certain points during the third control strategy).

The dosing circuit 222 may additionally command reductant dosing from the first reductant doser 126a based on an operating characteristic of the second SCR 124. This operating characteristic may include at least one of a temperature of the second SCR 124 (e.g., determined via the temperature sensor 152) or an amount of ammonia stored on the second SCR 124 (e.g., determined via the ammonia sensor or other ways as described above). The dosing circuit 222 may command dosing based on the comparison of the operating characteristic to a fourth temperature threshold and/or an ammonia threshold. The values of the thresholds may be set based on a substantially optimal or desired operation of the second SCR 124. For example, the fourth temperature threshold may be set as a temperature value at which the second SCR 124 reaches a substantially optimal or desired NOx conversion efficiency (e.g., at or above a predefined amount, such as 80% and particularly 90%). As such, the fourth temperature threshold may be a temperature or range of temperatures greater than the minimum temperature threshold and less than the maximum temperature threshold (i.e., between the second temperature threshold and the third temperature threshold). In some embodiments, the fourth temperature threshold may correspond with a range of temperatures at or above the second temperature threshold such that the fourth temperature threshold and second temperature threshold are the same/coincide. The ammonia threshold may be set as an amount of stored ammonia above which there is a substantial risk of ammonia slip (e.g., above a predefined acceptable amount of ammonia slip). As such, these predefined thresholds (particularly the fourth temperature threshold) are differentiated from the first and second temperature thresholds above in that the fourth temperature threshold is associated with a substantially optimal NOx conversion efficiency, as opposed to a minimum desired NOx conversion efficiency.

If the second SCR 124 temperature is below the first temperature threshold and the amount of stored ammonia on the second SCR 124 is below the predefined stored ammonia threshold, then the dosing circuit 222 commands an increase in dosing quantity from the first reductant doser 126a. Because the second SCR 124 temperature is slightly less than desired (e.g., below a temperature range where NOx conversion efficiency is at or above a predefined threshold), the increased dosing from the first reductant doser 126a allows the first SCR 121 to compensate for the lower temperature of the second SCR 124. Further, because the amount of ammonia storage on the second SCR 124 is relatively lower (i.e., below the predefined stored ammonia threshold amount or value), the increased dosing from the first reductant doser 126a is likely not to cause ammonia slip above a predefined ammonia slip threshold. As such, a goal of the dosing circuit 222 with the third control strategy is, in part, to assist with DeNOx (i.e., reduction of NOx) and the mitigation of ammonia slip while the second SCR 124 is at a lower temperature. Additionally, when the temperature of the second SCR is relatively low as in this case, the maximum NOx conversion capability of the SCR is substantially tied to the amount of NH3 stored on the second SCR. That is, a certain amount of NH3 storage may be required to be present for the second SCR to perform optimally. When this NH3 storage is not present, increased dosing on the first SCR is used to ensure or substantially ensure the desired system-level NOx conversion is achieved.

If at least one of the operating characteristics (i.e., second SCR 124 temperature, second SCR 124 ammonia storage) is above their respective predefined thresholds, the dosing circuit 222 commands relatively less reductant dosing from the first reductant doser 126a (e.g.: commands reductant dosing below a predefined level/amount/or rate; or, commands dosing below a current amount by more than a predefined amount or value; etc.). In some embodiments, the dosing circuit 222 commands less reductant dosing compared to the reductant dosing amount on the second SCR when both operating characteristics (i.e., second SCR 124 temperature and second SCR 124 ammonia storage) are above their respective predefined thresholds, while in other embodiments, the dosing circuit 222 commands less reductant dosing when only one operating characteristic is above its respective predefined threshold. The dosing circuit 222 commands less reductant dosing from the first reductant doser 126a in order to allow some unconverted NOx to pass through the first SCR 121, which can be used to regenerate the DOC 122 and/or DPF 123. Because the second SCR 124 is either at an optimal conversion temperature (i.e., above the fourth temperature threshold) or has an optimal amount of stored ammonia for reacting with the NOx (i.e., above the ammonia threshold), the dosing circuit 222 allows NOx to pass through unconverted knowing that the second SCR 124 is able to convert the passed-through NOx to less harmful compounds (e.g., nitrogen and water). As such, another primary goal of the dosing circuit 222 with the third control strategy is, in part, to passively regenerate the DPF by allowing pass-through NOx to oxidize soot on the DPF.

In some embodiments, regardless of the operating characteristics of the second SCR 124, the dosing circuit 222 may command increased reductant dosing if operation of the system 100 requires optimal (or substantially optimal) conversion from both the first SCR 121 and the second SCR 124. For example, if the engine 101 is producing a high amount of NOx flux and/or of engine-out exhaust flow, the dosing circuit 222 commands increased (or not decreased) reductant dosing from the first reductant doser 126a so that both the first SCR 121 and the second SCR 124 are optimally (or substantially optimally) reducing NOx in the exhaust stream. As such, the dosing circuit 222 protocol or operation may be overridden by an operating characteristic of the system 100 or engine 101.

In some embodiments, the dosing circuit 222 may also command reductant dosing from the first reductant doser 126a based on a rate of change of a temperature of the first SCR 121. Because the first SCR 121 is closer to the engine 101 than the second SCR 124, the first SCR 121 is more directly and immediately affected by changes in exhaust gas temperature from the engine 101. Therefore, the rate of change of the temperature of the first SCR 121 may be used to predict or approximate a rate of change of a temperature of the second SCR 124. As such, if the dosing circuit 222 determines that the rate of change of the temperature of the first SCR 121 is negative (i.e., decreasing, which may be determined by the amount of decrease going at or above a predefined amount relative to a current temperature and also may be based on the decrease persisting for a predefined amount of time in order to avoid transient increases and decreases), the dosing circuit 222 commands increased dosing from the first reductant doser 126a in order to anticipate a reduction in the second SCR 124 temperature and to avoid a disruption in NOx reduction by the second SCR 124 temperature.

If the dosing circuit 222 receives an indication of the fourth strategy (i.e., the temperature of the second SCR 124 is above the third temperature threshold), the dosing circuit 222 commands substantially standard operation from the second reductant doser 126b (i.e., dosing reductant for the second SCR 124 as if the second SCR 124 was the sole SCR in a single-SCR aftertreatment system) and commands increased dosing from the first reductant doser 126a in order to achieve a substantially maximum NOx conversion from both the first SCR 121 and the second SCR 124.

The thermal management circuit 224 is structured or configured to receive data indicative of an operating status of the first SCR 121 and/or second SCR 124 and to determine a thermal management mode based on the received data. The data indicative of the operating status of the SCRs includes at least one of: a) a temperature of the first SCR 121; b) a temperature of the second SCR 124; c) an amount of ammonia stored on the first SCR 121; d) an amount of ammonia stored on the second SCR 124; or, e) an amount of stored enthalpy in the aftertreatment system 120 components upstream of the second SCR 124. The stored enthalpy in the aftertreatment components can be used to predict a response of the second SCR 124 (i.e., ability to reduce NOx) to subsequent transient exhaust conditions, and can be estimated based on a temperature of the upstream aftertreatment system 120 components, a mass of the components, and a heat capacity of each component (e.g., the temperature, mass, and thermal properties (specific heat, internal and external conduction/convection/radiation coefficients) of each aftertreatment component, for example, a lumped capacitance or similar pseudo-transient approach).

Once the data indicative of the operating status of the first SCR 121 and second SCR 124 is received, the thermal management circuit 224 determines the thermal management mode to be either a first thermal management mode or a second thermal management mode. In the first thermal management mode, the thermal management circuit 224 maintains or substantially maintains an operating temperature for the first SCR 121 (i.e., a temperature at which the first SCR 121 is able to efficiently reduce NOx in the exhaust stream at or above a predefined NOx conversion efficiency). In the second thermal management mode, the thermal management circuit 224 maintains or substantially maintains an operating temperature for both the first SCR 121 and the second SCR 124, which promotes a more complete aftertreatment system 120 performance at the cost of additional exhaust energy. Although two thermal management modes are discussed, any number of thermal management modes may be contemplated as part of the thermal management circuit 224, each with their own functions and associated operating characteristics.

Once the thermal management mode (if any) is determined, the thermal management circuit 224 may issue, generate, and/or provide commands to one or more system 100 components in order to heat the first SCR 121 and/or the second SCR. In some embodiments, this command may be to the heater 129 to warm aftertreatment system 120 components (e.g., the first SCR 121, the DOC 122, the DPF 123, the second SCR 124, etc.). In other embodiments, this command may be to the engine 101 to increase a load on or a fueling amount to the engine 101, thereby increasing a temperature of the exhaust gas output by the engine 101. In further embodiments, this command may be to engage Hydrocarbon (HC) dosing in the exhaust stream, which combusts in the exhaust or on the DOC 122 and raises a temperature of the exhaust gas.

Figure 10:
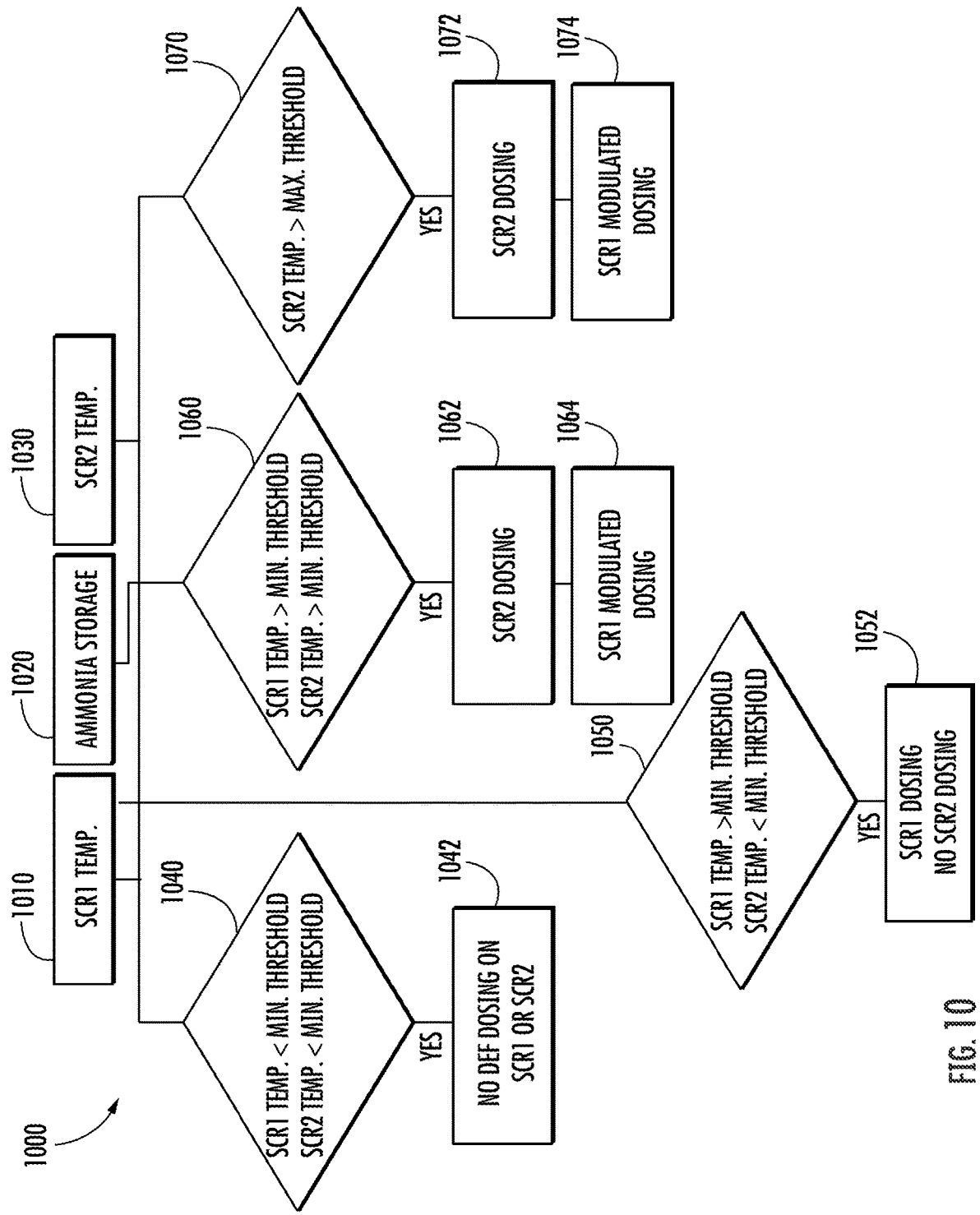
FIG. 10 is a flowchart of a method for modulating a dosing strategy of a dual SCR exhaust aftertreatment system, according to an exemplary embodiment.
Figure 11:
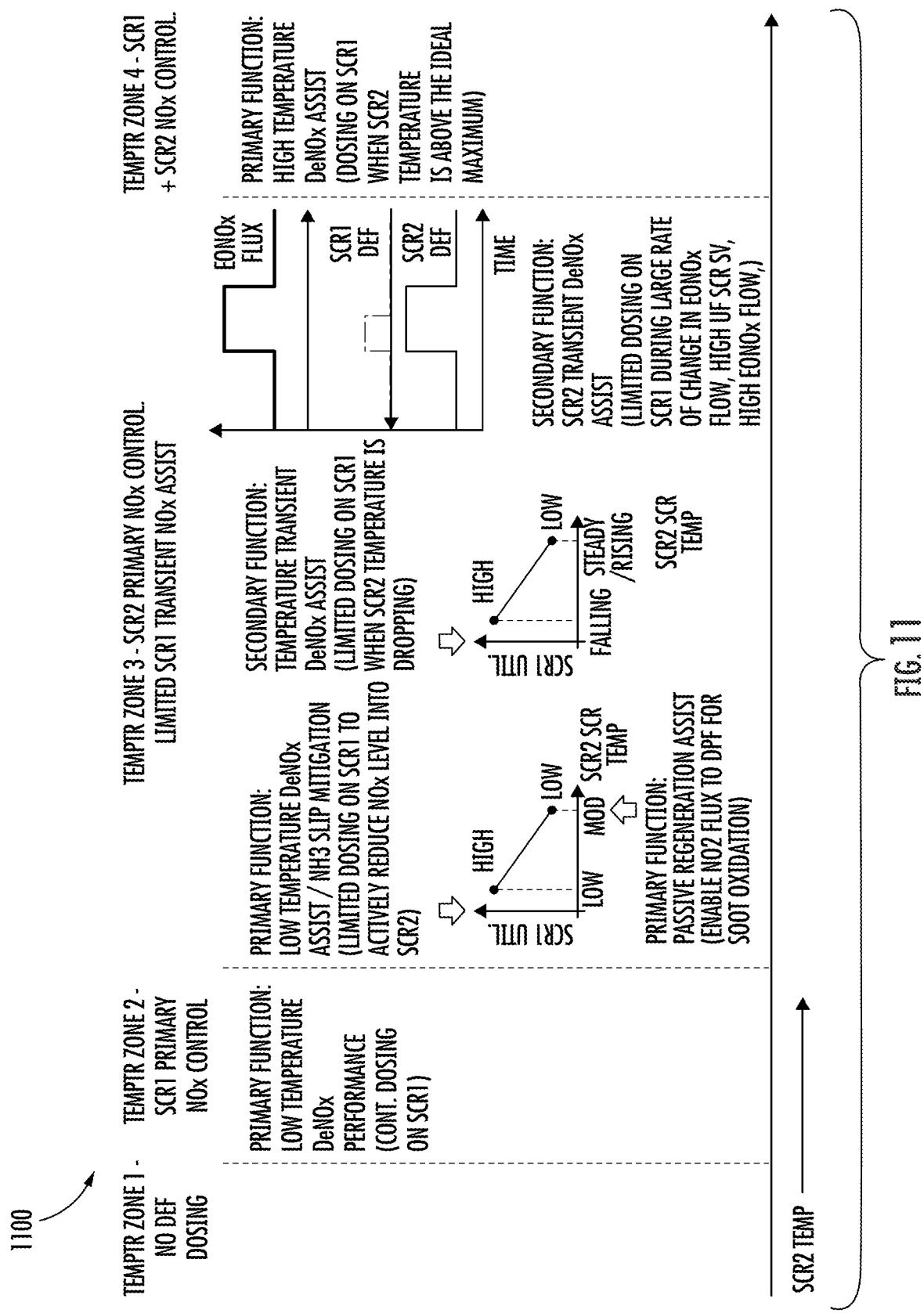
FIG. 11 is a graphical representation of the method of FIG. 10, according to an exemplary embodiment.

Based on the foregoing and referring now to FIG. 10, a flowchart of a method 1000 for modulating a dosing strategy of a multiple SCR exhaust aftertreatment system is shown, according to an example embodiment. The method may be performed by the controller 140 and, as such, reference to the controller 140 and other components FIGS. 1-2 may be referenced. As described herein, the first and second reductant dosers 126a and 126b are controlled to ensure or substantially ensure sufficient ammonia is available for the first and second SCR systems 121 and 124 to convert NOx in the exhaust gas to less environmentally harmful elements. The reductant dosing strategy is controlled, by the controller 140, as a function of the temperatures of the first and second SCR systems 121 and 124 and their respective NH3 storage levels. FIG. 11 shows a graphical illustration 1100 of the method 1000 across the four different zones described below, according to an example embodiment. It should be understood that first SCR is abbreviated as SCR1 and the second SCR is abbreviated as SCR2 in FIGS. 10-12, as well as the accompanying description.

At processes 1010, 1020, and 1030, first SCR 121 (1010) temperature data is received, second SCR 124 temperature data is received (1030), and the ammonia storage amount for the second SCR 124 is determined by the controller (1020). The ammonia storage amount may be determined by the controller 140 via the processes described above. While shown as being determined for the second SCR 124, it should be understood that in some embodiments, the controller 140 may also determine or estimate an ammonia storage amount for the first SCR 121 as well using the same or similar processes described herein.

At process 1040, the controller 140 determines whether the first SCR 121 temperature data and the second SCR 124 temperature data are each below a predefined minimum temperature threshold (i.e., first and second temperature thresholds as described above with respect to the temperature circuit and dosing circuit). As described above, in one embodiment, the predefined minimum temperature threshold is the same value for each of the first and second SCRs 121 and 124. In another embodiment, a different minimum temperature threshold is used for each SCR 121 and 124. In a first zone, at process 1042 and in response to the controller 140 determining that the first SCR 121 temperature data and the second SCR 124 temperature data are each below their respective predefined minimum temperature thresholds, the controller 140 controls the first and second dosers 126*a* and 126*b* to not dose on either of the first and second SCRs 121 and 124. Because the temperature associated with the first and second SCRs 121 and 124 is below a desired a temperature for converting NOx to less harmful compounds, by managing the dosers to cease dosing, the controller 140 limits the amount of unreacted ammonia in the system that may lead to ammonia slip amounts above a predefined acceptable level.

At process 1050, the controller 140 compares the SCR1 temperature and SCR2 temperature data to first and second temperature thresholds (i.e., first and second minimum temperature thresholds). In a second zone, the controller 140 determines that the first SCR temperature is at or above the first minimum temperature threshold while the second SCR temperature is below the second minimum temperature threshold. In this situation, the first SCR 121 is at an operating temperature associated with desired operating characteristics (e.g., NOx conversion at a desired rate) while the second SCR 124 is below the desired operating temperature. Accordingly, at process 1052, the controller commands the first doser 126*a* to dose in a manner to achieve substantially the greatest operating characteristic for the first SCR 121 (e.g., a maximum NOx conversion efficiency) while the controller 140 commands the second doser 126*b* to not dose or cease dosing. In this regard, the controller 140 is using the first SCR 121 because of its elevated temperature to manage NOx emissions while also substantially preventing undesired ammonia slip from the aftertreatment system by ceasing dosing on the second SCR because the second SCR 124 is not at a desired operating temperature yet.

At process 1060, in a third zone, the controller 140 determines that the first SCR temperature is at or above the first minimum temperature threshold while the second SCR temperature is at or above the second minimum temperature threshold. In this situation, both of the first and second SCRs 121 and 124 are at desired operating temperatures for, e.g., NOx conversion. In response to this determination, at process 1062, second SCR dosing via the second reductant doser 126*b* is operated by the controller 140 to achieve the greatest operating characteristic for the second SCR 124 (e.g., a maximum NOx conversion rate). Additionally, at process 1064, first SCR 121 reductant dosing via the first reductant doser 126*a* is modulated depending on the temperature and NH3 storage of the second SCR 124. When temperature and/or NH3 storage of the second SCR 124 are lower (i.e., below certain predefined thresholds, such as the fourth threshold), the first SCR reductant dosing is increased by the controller 140 to maintain optimal NOx conversion across the full system. When temperature and/or NH3 storage of the second SCR 124 are higher (i.e., above predefined thresholds, such as the fourth temperature threshold if different from the second temperature threshold), the first SCR reductant dosing is reduced by the controller 140 to allow NOx to pass downstream of the first SCR 121, where it can be utilized by the DOC/DPF for soot oxidation and converted downstream by the second SCR 124. In this region, the reductant dosing on the first SCR 121 may selectively be increased by the controller 140 in conditions of high engine-out exhaust flow and NOx flux, when the controller 140 utilizes both SCRs to achieve optimal NOx conversion regardless of the temperature/NH3 storage level of the second SCR 124. In this zone and as described herein, the relative reductant dosing of the first SCR can also be modulated based on the temperature rate of change of the first SCR 121 as a predictor of temperature change in the second SCR 124. When the first SCR temperature decreases quickly, the reductant dosing rate of the first SCR is increased to avoid a potential disruption in system NOx conversion from a predicted decrease in temperature of the second SCR.

At process 1070, in a fourth zone, the controller 140 determines that the second SCR temperature is at or above a maximum temperature threshold (i.e., the third temperature threshold described herein) based on the second SCR temperature data. In response, second SCR 124 dosing continues to operate for a desired characteristic (e.g., maximum NOx conversion) by the controller 140 (process 1072). However in this fourth zone, the temperature of the second SCR 124 is above the peak NOx conversion condition for the catalyst. Therefore, reductant dosing is increased on the first SCR catalyst by the controller 140 to increase the overall system NOx conversion (process 1074). Thus, the controller 140 determines that the efficacy of the second SCR 124 in this situation may not be as prominent as desired due to its higher/elevated temperature (above the third temperature threshold) and, in turn, commands dosing for the first SCR 121 to aid NOx conversion for the system as a whole to maintain emissions as desired.

It should be understood that the amount that the controller 140 modulates reductant dosing (e.g., increase, decrease, etc.) from the first and second dosers is highly configurable and may be dependent on operating characteristics of the system (e.g., a current NOx conversion efficiency, SCR and engine system characteristics such as size of the SCRs, engine power output, SCR degradation or age, etc.). In this regard, the amount of decrease or increase relative to a current dosing amount may be depending on the characteristics of the system and are highly variable.

Figure 12:
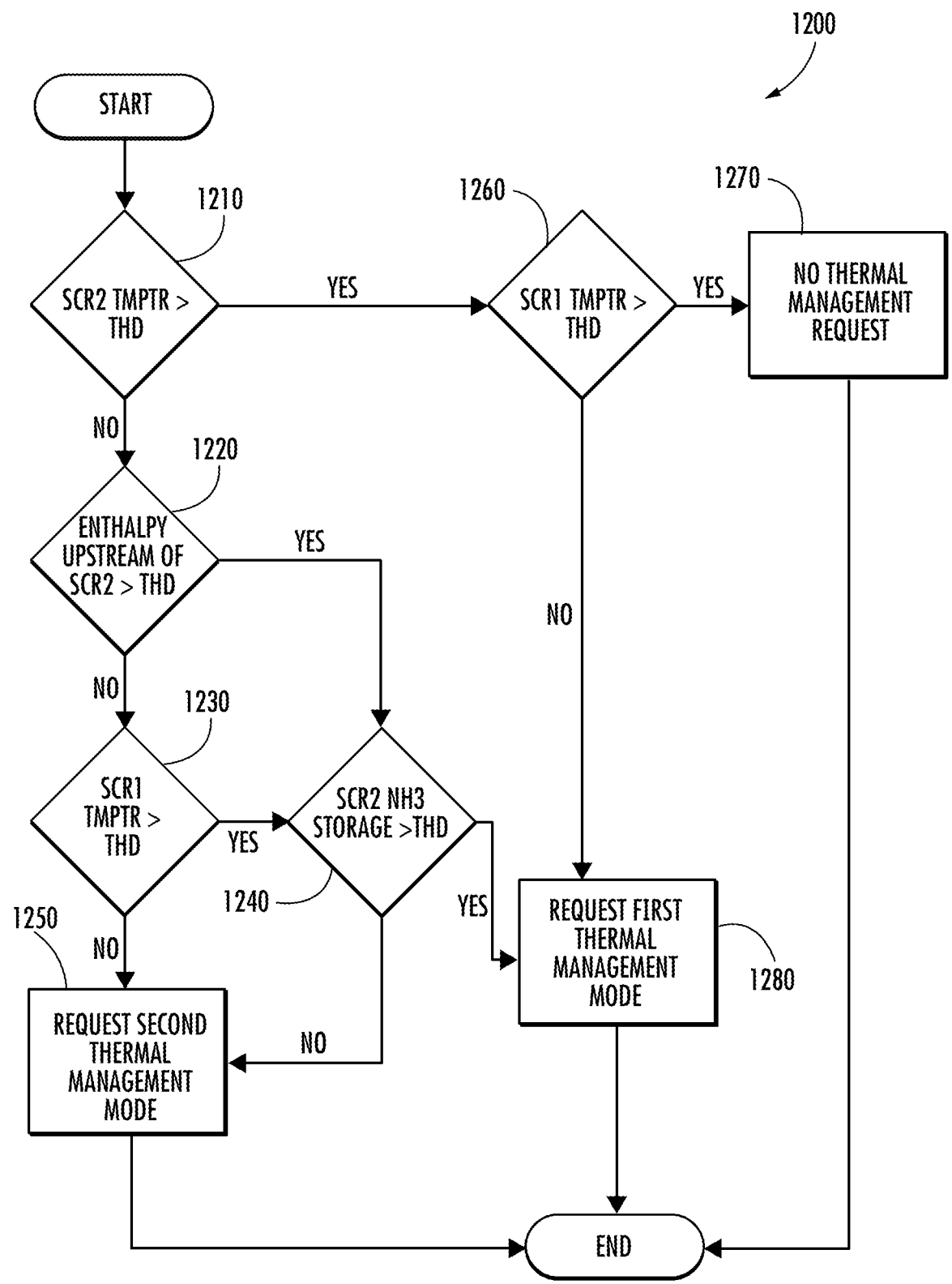
FIG. 12 is a flowchart of a method for determining a thermal management mode, according to an exemplary embodiment.

Referring now to FIG. 12, a flowchart illustrating an exemplary method 1200 for determining a thermal management mode is shown, according to an example embodiment. The method 1200 may be performed by the controller 140 and, in particular, the thermal management circuit 224. The method 1200 may be structured to provide thermal management to the exhaust aftertreatment system to, for example, maintain NOx conversion to less environmentally harmful elements below a predefined threshold, reduce particulate matter emissions, reduce CO and greenhouse gases emissions, reduce build-up on the aftertreatment system components, and other thermal management benefits.

The method 1200 begins at process 1210, where the temperature of the second SCR 124 is compared to a second threshold value. If the second SCR 124 temperature exceeds the second threshold (1210:YES), the method 1200 proceeds to process 1260, where the temperature of the first SCR 121 is compared to a first threshold value. If the first SCR 124 temperature exceeds the first threshold (1260:YES), the method 1200 proceeds to process 1270 and does not initiate a particular thermal management mode. Put differently, if both the first SCR 121 and the second SCR 124 are above their respective temperature thresholds, the thermal management circuit 224 (i.e., controller 140) does not initiate a thermal management mode.

At process 1260 when the second SCR temperature is above the second temperature threshold described herein, if the first SCR 121 temperature is not above the first threshold (1260:NO), the method 1200 proceeds to process 1280 where the first thermal management mode is initiated. As discussed above, in the first thermal management mode, the thermal management circuit 224 focuses on maintaining an operating temperature for the first SCR 121. Therefore, this thermal management mode is initiated based on the first SCR 121 being below a desired temperature (i.e., the first threshold). In this situation, when the second SCR is warm but the first SCR (closer to the engine) is not, there is expected to be a pending decrease in temperature at the second SCR. Thus, a thermal management activation is requested to slow this expected cooling, similar to the DEF/reductant dosing modulation performed based on an expected temperature decrease in the second SCR.

Returning to process 1210, if the second SCR 124 temperature is not above the second threshold (process 1210:NO), the method 1200 proceeds to process 1220 and determines if the enthalpy stored in the aftertreatment system 120 components upstream of the second SCR 124 is above a threshold value. If the upstream stored enthalpy is not above the threshold value, the method 1200 proceeds to process 1230 and determines if the first SCR 121 temperature exceeds the first threshold. If the first SCR 121 temperature does not (process 1230:NO), the method 1200 proceeds to process 1250 and initiates the second thermal management mode. As discussed above, in the second thermal management mode, the thermal management circuit 224 focuses on maintaining operating temperatures for both the first SCR 121 and the second SCR 124. Therefore, this thermal management mode is selected based on neither SCR being at an operating temperature (i.e., at temperatures where NOx conversion is below a desired value) and a relatively low upstream enthalpy indicating that the second SCR 124 is unlikely to reach the operating temperature from normal operation.

If the upstream stored enthalpy is above the threshold value (process 1220:YES) or if the first SCR 121 temperature is above the first threshold (process 1230:YES), the method 1200 proceeds to process 1240 and determines if a second SCR 124 has an amount of stored ammonia that is above a threshold value. If the amount of stored ammonia is below the threshold value (process 1240:NO), the method 1200 returns to the second thermal management mode at process 1250. If the amount of stored ammonia is above the threshold value (process 1240:YES), the method 1200 returns to the first thermal management mode at process 1280, due to the higher amount of stored ammonia indicating that the second SCR 124 can reach a desired conversion efficiency without dedicated heating efforts (e.g., prioritizing heating of second SCR 124 via heater 129).

Figure 13:
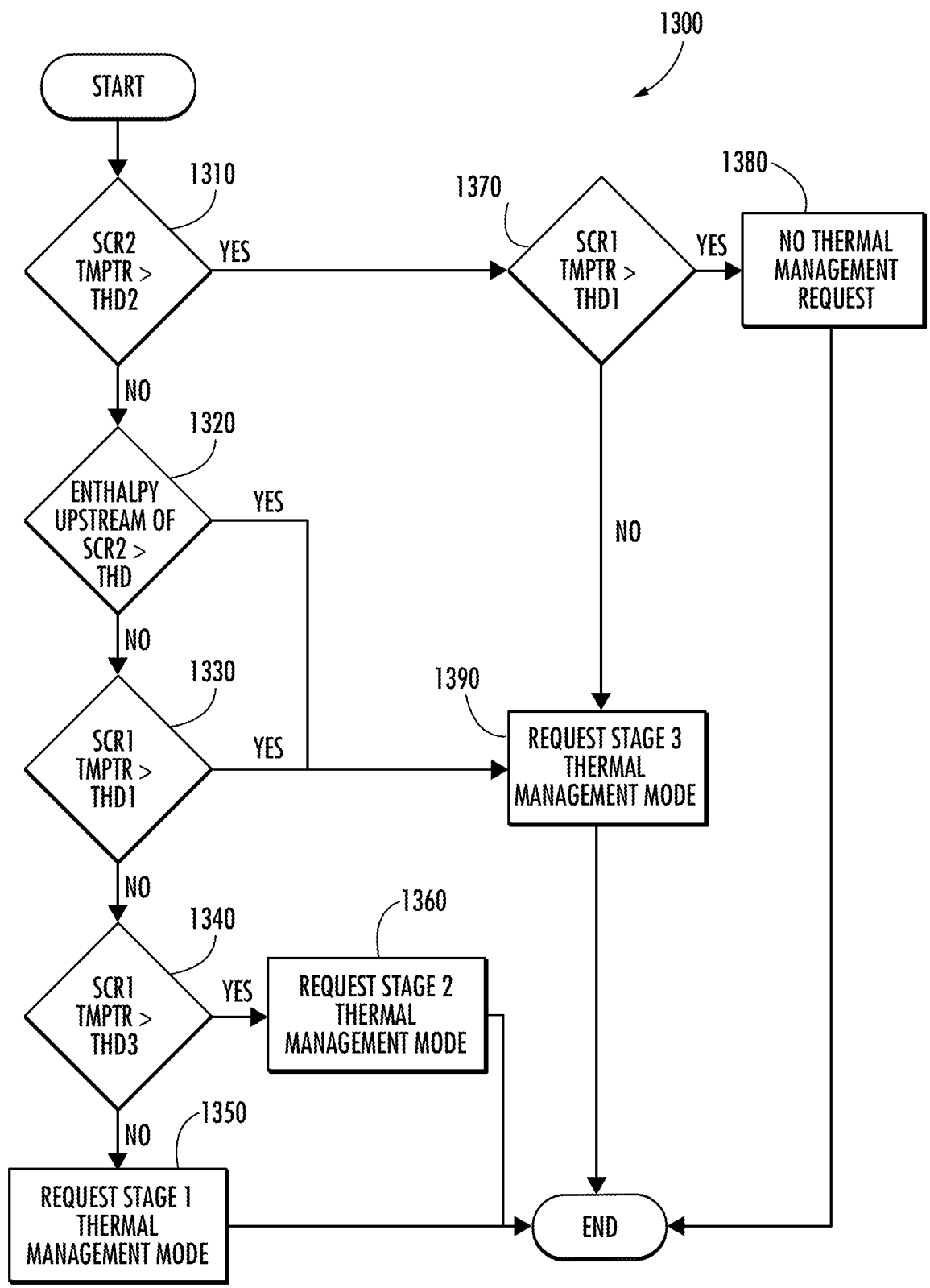
FIG. 13 is a flowchart of a method for determining a stage of thermal management mode, according to an exemplary embodiment.

Referring now to FIG. 13, a flowchart illustrating an exemplary method 1300 for determining a stage of thermal management mode is shown, according to an example embodiment. The method 1300 may be performed by the controller 140 and, in particular, the thermal management circuit 224. The method 1300 may be structured to provide thermal management to the exhaust aftertreatment system to, for example, maintain NOx conversion to less environmentally harmful elements below a predefined threshold, reduce particulate matter emissions, reduce CO and greenhouse gases emissions, reduce build-up on the aftertreatment system components, and other thermal management benefits.

The method 1300 begins at process 1310, where the temperature of the second SCR 124 is compared to a second threshold value (the second threshold value being specific to the second SCR 124 and may differ from thresholds used with the first SCR 121). If the second SCR 124 temperature exceeds the second threshold (1310:YES), the method 1300 proceeds to process 1360, where the temperature of the first SCR 121 is compared to a first threshold value. If the first SCR 121 temperature exceeds the first threshold (1370:YES), the method 1300 proceeds to process 1380 and does not initiate a particular thermal management mode. Put differently, if both the first SCR 121 and the second SCR 124 are above their respective thresholds, which in this instance are temperature thresholds, the thermal management circuit 224 (i.e., controller 140) does not initiate a thermal management mode.

At process 1360 when the second SCR temperature is above the second temperature threshold described herein and the first SCR 121 temperature is not above the first threshold (1370:NO), the method 1300 proceeds to process 1390 where a stage 3 thermal management mode is initiated. The stage 3 thermal management mode is performed similarly to the first thermal management mode. As discussed above, in the first thermal management mode, the thermal management circuit 224 (controller 140) is structured to maintain or substantially maintain an operating or desired temperature for the first SCR 121 as the temperature of the first SCR 121 increases and decreases throughout operation. Therefore, this thermal management mode is initiated based on the first SCR 121 being below a desired temperature (i.e., the first threshold). In this situation, when the second SCR is warm (within a predefined warm temperature range) but the first SCR (closer to the engine) is not, there is expected to be a pending decrease in temperature at the second SCR. Thus, a thermal management activation is initiated by the controller 140 to slow this expected cooling, similar to the DEF/reductant dosing modulation performed based on an expected temperature decrease in the second SCR.

Returning to process 1310, if the second SCR 124 temperature is not at or above the second threshold (i.e., below the second threshold) (process 1310:NO), the method 1300 proceeds to process 1320 and determines if the enthalpy stored in the aftertreatment system 120 components upstream of the second SCR 124 is at or above a threshold value. If the upstream stored enthalpy is not above the threshold value (i.e., below the threshold value), the method 1300 proceeds to process 1330 and determines if the first SCR 121 temperature is at or above the first threshold (e.g., 1320:NO).

If the first SCR 121 temperature does not exceed the first threshold (i.e., is below the first threshold) (process 1330:NO), the method 1300 proceeds to process 1340 and determines if the first SCR 121 temperature is at or above a third threshold (e.g., predefined third threshold value less than the first threshold). The third threshold is an intermediate temperature threshold between the first threshold and the second threshold.

If the first SCR 121 temperature also does not exceed the third threshold (i.e., is below the third threshold) (e.g., 1340:NO), the methods 1300 proceeds to process 1350 and initiates a stage 1 thermal management mode. The stage 1 thermal management mode is performed, at least in part, similarly to the second thermal management mode of FIG. 12, for example. The stage 1 thermal management mode is selected (e.g., by the thermal management circuit 224 of the controller 140) based on neither SCRs being at predefined desired operating temperatures (i.e., at temperatures where NOx conversion is below a desired value, an absolute temperature range, etc.) and a relatively low upstream enthalpy indicating that the second SCR 124 is unlikely to reach the operating temperature from normal operation.

If the first SCR 121 temperature is exceeds the third threshold, the method 1300 proceeds to process 1360 and the controller 140 initiates a stage 2 thermal management mode. The stage 2 thermal management mode is performed, at least in part, similarly to the second thermal management mode of FIG. 12, for example. The stage 1 and stage 2 thermal management modes are configured to manage the temperatures and NOx conversions of the first SCR 121 during initial warming of the aftertreatment system 120. As discussed above, in the second thermal management mode, the thermal management circuit 224 (controller 140) is structured to maintain or substantially maintain operating temperatures for both the first SCR 121 and the second SCR 124 when the operating temperatures of the SCRs are below the associated temperature thresholds. In such case, using the second thermal management mode, the controller 140 increases/raises the temperatures of the SCR(s) until at least the first SCR 121 operates at a desired operating temperature (e.g., above the predefined temperature threshold).

In various arrangements, in stage 1 or stage 2 thermal management modes, the thermal management circuit 224 (controller 140) is structured to manage one or more components of the system 100 or the aftertreatment system 120 based on whether the first SCR 121 is above (or equal to) the third threshold (e.g., intermediate temperature threshold). For example, on an engine start event, it may be desirable to operate in a low engine-out NOx state until the first SCR 121 is at a certain temperature threshold (e.g., third threshold) that is capable of at least some NOx conversion (e.g., 70%, 80%, etc., below a "warm" state of the first SCR 121). Hence, the controller 140 is structured to initiate the stage 1 thermal management mode to maintain the low engine-out NOx state based on the operating temperature of the first SCR 121 being below the third threshold. In response to the operating temperature of the first SCR 121 reaching the third threshold, the controller 140 is structured to initiate the stage 2 thermal management mode. In the stage 2 thermal management mode, the controller 140 can allow relatively more emission of NOx (e.g., intermediate engine-out NOx state emitting more NOx relative to the low engine-out NOx state) from the engine 101. More emission of NOx corresponds to a higher exhaust temperature (e.g., more exhaust gas traversing the pipeline) for accelerating the temperature increase of at least the first SCR 121. Hence, the stage 1 and stage 2 thermal management modes can be configured as variations of the second thermal management mode depending on whether the first SCR 121 is capable of no NOx conversion (e.g., stage 1), limited NOx conversion (e.g., stage 2), or full NOx conversion (e.g., stage 3 or no thermal management mode).

If the upstream stored enthalpy is at or above the threshold value (process 1320:YES) or if the first SCR 121 temperature is at or above the first threshold (process 1330:YES), the method 1300 proceeds to process 1390 and the controller 140 initiates the stage 3 thermal management mode. In this case, the stage 3 thermal management mode is configured to maintain or recover the operating temperature of the first SCR 121 and the second SCR 124 when at least one of the SCRs is at or above the desired temperature threshold (e.g., first threshold and/or second threshold).

In some scenarios, the first SCR 121 is at the desired operating temperature and the second SCR 124 is not at the desired operating temperature in response to a start event (e.g., engine start event). In this scenario, the exhaust gas from the engine 101 increases the temperature of the components of the aftertreatment system 120 according to their placements relative to the engine 21. For simplicity, the first SCR 121 is positioned closer to the engine 101 and can be heated to the desired operating temperature before the second SCR 124.

In some other scenarios, the second SCR 124 is at the desired operating temperature and the first SCR 121 is not at the desired operating temperature. For example, during an extended idling period or engine motoring state where the exhaust gas from the engine 101 is cooler than the SCR substrates, the components of the aftertreatment system 120 are cooled according to their placement order relative to the engine 101 (e.g., the first SCR 121 cooled before the second SCR 124). In any one of the example scenarios, the thermal management circuit 224 (controller 140) initiates/activates stage 3 thermal management mode to maintain the operating temperatures of the SCRs within the desired temperature range.

In various implementations, the controller 140 checks for upstream enthalpy in the case where the engine starts after a relatively short duration shutdown event, where the aftertreatment system 120 (e.g., components of the aftertreatment system 120) may remain warm until the start of the engine 101. In such cases, the operating temperature of at least one of the first SCR 121 or the second SCR 124 may have decreased below the predefined temperature threshold during the engine-off period. However, if the upstream enthalpy is above the associated threshold (e.g., energy stored in the upstream component(s) of the aftertreatment system 120 is sufficient), the thermal management circuit 224 (controller 140) determines that the temperature of the at least one of the first SCR 121 or the second SCR 124 will reach the desired temperature threshold within a relatively short time period (e.g., 10 seconds, 20 seconds, 30 seconds, etc.). In this case, the controller 140 determines that a higher level of thermal management mode (e.g., stage 1 or stage 2) may not be necessary, and activates the stage 3 thermal management mode.

In some implementations, if the amount of stored ammonia is at or above the threshold value, the method 1300 returns to the first thermal management mode at process 1390, due to the higher amount of stored ammonia indicating that the second SCR 124 can reach a desired conversion efficiency without dedicated heating efforts (e.g., prioritizing heating of second SCR 124 via heater 129).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the temperature circuit 220, the dosing circuit 222, and the thermal management circuit 224 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method, comprising:
receiving, by a controller, data indicative of a first Selective Catalytic Reduction (SCR) catalyst and a second SCR catalyst of an aftertreatment system, wherein the data includes a first temperature regarding the first SCR catalyst, a second temperature regarding the second SCR catalyst, and a reductant storage of the second SCR catalyst, wherein a first reductant doser is associated with the first SCR catalyst and a second reductant doser is associated with the second SCR catalyst;
determining, by the controller, a reductant dosing strategy based on a comparison of the first temperature and the second temperature to a first temperature threshold and a second temperature threshold, respectively;
commanding, by the controller responsive to the first temperature being at or above the first temperature threshold and the second temperature being at or above the second temperature threshold, relatively more dosing from the second reductant doser than from the first reductant doser or relatively less dosing from the first reductant doser than from the second reductant doser;
determining, by the controller, to increase or decrease an amount of reductant dosing during an activation of the first reductant doser associated with the first SCR catalyst based on at least one of the second temperature or the reductant storage associated with the second SCR catalyst; and
commanding, by the controller and based on the determination to increase or decrease the amount of reductant dosing according to the second temperature and the reductant storage associated with the second SCR catalyst, an increase or a decrease in the amount of reductant dosing from the first reductant doser during the activation of the first reductant doser.

2. The method of claim 1, wherein commanding the amount of reductant dosing comprises:
determining that the first temperature regarding the first SCR catalyst is below the first temperature threshold and the second temperature regarding the second SCR catalyst is below the second temperature threshold; and
commanding the first reductant doser upstream of the first SCR catalyst and the second reductant doser upstream of the second SCR catalyst to cease dosing of the first SCR catalyst and the second SCR catalyst.

3. The method of claim 1, wherein commanding the amount of reductant dosing comprises:
determining that the first temperature regarding the first SCR catalyst is above the first temperature threshold and a second temperature regarding the second SCR catalyst is below the second temperature threshold;
commanding the first reductant doser upstream of the first SCR catalyst to dose the first SCR catalyst with reductant; and
commanding the second reductant doser upstream of the second SCR catalyst to cease dosing of the second SCR catalyst with reductant.

4. The method of claim 1, wherein the data includes an indication of the reductant storage of at least one of the first SCR catalyst or the second SCR catalyst, and wherein commanding the amount of reductant dosing comprises:
determining that the first temperature regarding the first SCR catalyst is at or above the first temperature threshold and the second temperature regarding the second SCR catalyst is at or above the second temperature threshold; and
commanding the first reductant doser upstream of the first SCR catalyst to dose the first SCR catalyst based on determining that the first temperature regarding the first SCR catalyst is at or above the first temperature threshold and the second temperature regarding the second SCR catalyst is at or above the second temperature threshold.

5. The method of claim 4, wherein commanding the first reductant doser comprises:
increasing the amount of reductant dosing from the first reductant doser based on at least one of the second temperature or the reductant storage of the second SCR catalyst being lower than a third threshold.

6. The method of claim 4, wherein commanding the first reductant doser comprises:
decreasing the amount of reductant dosing from the first reductant doser based on at least one of the second temperature or the reductant storage of the second SCR catalyst being at or above a third threshold.

7. The method of claim 1, further comprising:
determining, by the controller and based on the data indicative of the first SCR catalyst and the second SCR catalyst, a thermal management mode; and
commanding, by the controller, at least one of activation of a heater or an engine to increase a temperature of at least one of the first SCR catalyst or the second SCR catalyst based on the thermal management mode.

8. An exhaust aftertreatment system, comprising
a first selective catalyst reduction (SCR) system coupled to a first reductant doser;
a second SCR system coupled to a second reductant doser, wherein the second SCR system and the second reductant doser are disposed downstream from the first SCR system and the first reductant doser; and
a controller coupled to the first and second SCR systems and the first and second reductant dosers, wherein the controller is configured to:
receive data indicative of a temperature of the first SCR system;
receive data indicative of a temperature of the second SCR system;
receive data indicative of a reductant storage of the second SCR system;
in response to the temperature of the first SCR system and the second SCR system being below a predefined temperature threshold, cease dosing from the first and second reductant dosers;
in response to the temperature of the first SCR system being at or above the predefined temperature threshold and the temperature of the second SCR system being below the predefined temperature threshold, command dosing from the first reductant doser and cease dosing from the second reductant doser;
in response to the temperature of the first SCR system being at or above the predefined temperature threshold and the temperature of the second SCR system being at or above the predefined temperature threshold, command relatively more dosing from the second reductant doser than from the first reductant doser or relatively less dosing from the first reductant doser than from the second reductant doser; and
command, during an activation of the first reductant doser, an increase or a decrease in an amount of reductant dosing from the first reductant doser upstream of the first SCR system to dose the first SCR system, wherein the amount of reductant dosing from the first reductant doser to increase or decrease is determined based on the temperature of the second SCR system and the reductant storage of the second SCR system.

9. The exhaust aftertreatment system of claim 8, wherein in response to the temperature of the first SCR system being at or above the predefined temperature threshold and the temperature of the second SCR system being at or above the predefined temperature threshold, the controller is further configured to command dosing from each of the first and second reductant dosers.

10. The exhaust aftertreatment system of claim 8, wherein the controller is further configured to:
in response to the temperature of the first SCR system being at or above the predefined temperature threshold and the temperature of the second SCR system being at or above a second predefined temperature threshold, command dosing from the first reductant doser based on the reductant storage of the second SCR system.

11. The exhaust aftertreatment system of claim 10, wherein the controller is further configured to:
increase the amount of reductant dosing from the first reductant doser based on at least one of the temperature or the reductant storage of the second SCR system being lower than an associated threshold.

12. The exhaust aftertreatment system of claim 10, wherein the controller is further configured to:
decrease the amount of reductant dosing from the first reductant doser based on at least one of the temperature or the reductant storage of the second SCR system being at or above an associated threshold.

13. An apparatus, comprising:
one or more processors; and
one or more memory devices coupled to the one or more processors, the one or more memory devices storing instructions that, when executed by the one or more processors, cause the one or more processors to:
receive data indicative of a first Selective Catalytic Reduction (SCR) catalyst and a second SCR catalyst of an aftertreatment system, wherein the data includes a first temperature regarding the first SCR catalyst, a second temperature regarding the second SCR catalyst, and a reductant storage of the second SCR catalyst, wherein a first reductant doser is associated with the first SCR catalyst and a second reductant doser is associated with the second SCR catalyst;
determine a reductant dosing strategy based on a comparison of the first temperature and the second temperature to at least one respective a first temperature threshold and a second temperature threshold, respectively;
command, responsive to the first temperature being at or above the first temperature threshold and the second temperature being at or above the second temperature threshold, relatively more dosing from the second reductant doser than from the first reductant doser or relatively less dosing from the first reductant doser than from the second reductant doser;
determine to increase or decrease an amount of reductant dosing during an activation of the first reductant doser associated with the first SCR catalyst based on at least one of the second temperature or the reductant storage associated with the second SCR catalyst; and
command, based on the determination to increase or decrease the amount of reductant dosing according to the second temperature and the reductant storage associated with the second SCR catalyst, an increase or a decrease in the amount of reductant dosing from the first reductant doser during the activation of the first reductant doser.

14. The apparatus of claim 13, wherein the instructions, when executed by the one or more processors, further cause the one or more processors to:
   determine that the first temperature regarding the first SCR catalyst is below the first temperature threshold and the second temperature regarding the second SCR catalyst is below the second temperature threshold; and
   command the first reductant doser upstream of the first SCR catalyst and the second reductant doser upstream of the second SCR catalyst to each cease dosing.

15. The apparatus of claim 13, wherein the instructions, when executed by the one or more processors, further cause the one or more processors to:
   determine that the first temperature regarding the first SCR catalyst is above the first temperature threshold and the second temperature regarding the second SCR catalyst is below the second temperature threshold;
   command reductant dosing from the first reductant doser upstream of the first SCR catalyst; and
   command the second reductant doser upstream of the second SCR catalyst to cease reductant dosing.

* * * * *